US012608963B2

(12) United States Patent
Hansen et al.

(10) Patent No.: US 12,608,963 B2
(45) Date of Patent: Apr. 21, 2026

(54) BLOOD ANALYSER WITH OUT-OF-FOCUS IMAGE PLANE ANALYSIS AND RELATED METHODS

(71) Applicant: Radiometer Medical ApS, Brønshøj (DK)

(72) Inventors: Thomas Steen Hansen, Brønshøj (DK); Ida Hollesen, Brønshøj (DK); Heine Hansen, Brønshøj (DK); Peter Emil Larsen, Brønshøj (DK); Thomas Jonasson Bjäräng, Brønshøj (DK)

(73) Assignee: Radiometer Medical ApS, Brønshøj (DK)

( * ) Notice: Subject to any disclaimer, the term of this patent is extended or adjusted under 35 U.S.C. 154(b) by 340 days.

(21) Appl. No.: 18/258,427

(22) PCT Filed: Dec. 22, 2021

(86) PCT No.: PCT/EP2021/087408
§ 371 (c)(1),
(2) Date: Jun. 20, 2023

(87) PCT Pub. No.: WO2022/136603
PCT Pub. Date: Jun. 30, 2022

(65) Prior Publication Data
US 2024/0037967 A1      Feb. 1, 2024

(30) Foreign Application Priority Data

Dec. 22, 2020      (EP) ..................................... 20216605

(51) Int. Cl.
G06T 7/00          (2017.01)
G06V 20/69         (2022.01)

(52) U.S. Cl.
CPC .......... G06V 20/698 (2022.01); G06T 7/0012 (2013.01); *G06T 2207/10024* (2013.01);
(Continued)

(58) Field of Classification Search
CPC .................... G06T 2207/30024; G06T 7/0012
See application file for complete search history.

(56) References Cited

U.S. PATENT DOCUMENTS

2008/0100703 A1 *   5/2008   Yamada ................. G02B 21/36
                                                                382/128
2010/0328434 A1 *  12/2010   Kiyota ............... G01N 35/0099
                                                                348/E13.001
(Continued)

FOREIGN PATENT DOCUMENTS

AU          2007203332 A1        8/2007
WO      WO 2014/094790 A1        6/2014

OTHER PUBLICATIONS

Ruberto, Celilia Di, et al. "Detection of Red and White Blood Cells from Microscopic Blood Images Using a Region Proposal Approach." Science Direct, University of Cagliari, Nov. 7, 2019, www. sciencedirect.com/science/article/pii/S0010482519303890?ref=pdf_d (Year: 2019).*

(Continued)

*Primary Examiner* — Siamak Harandi
*Assistant Examiner* — Jaspreet Kaur
(74) *Attorney, Agent, or Firm* — FBT Gibbons LLP

(57) ABSTRACT

A blood analyser and related methods, in particular a method of analysing a blood sample is disclosed. The blood analyser comprises a memory, an interface, and one or more processors. The blood analyser is configured to obtain image data of a prepared blood sample; select a first image associated with a first image plane of the prepared blood sample from the image data; characterize the first image, wherein the characterization of the first image comprises to determine a first set of cell regions belonging to the first image plane; select a first distal image associated with a first distal image plane on a distal side of the first image plane, and determine a first distal set of distal cell regions associated with the first (Continued)

set of cell regions; and determine a first cell parameter for each cell region of the first set of cell regions based on the first distal set of distal cell regions.

16 Claims, 5 Drawing Sheets

(52) U.S. Cl.
CPC ............... *G06T 2207/20036* (2013.01); *G06T 2207/30024* (2013.01); *G06T 2207/30101* (2013.01)

(56) References Cited

U.S. PATENT DOCUMENTS

| | | | |
|---|---|---|---|
| 2017/0161545 A1* | 6/2017 | Champlin | ............ G06V 20/695 |
| 2020/0072730 A1* | 3/2020 | Wong | ........................ G01N 1/30 |

OTHER PUBLICATIONS

Murali, Swetha, et al., "Continuous stacking computational approach based automated microscope slide scanner," *Rev. Sci. Instrum.*, pp. 23701-23701 (2018).
International Search Report of International Application No. PCT/EP2021/087408, dated Apr. 20, 2022 (3 pages).
Written Opinion of the International Search Authority for International Application No. PCT/EP2021/087408 (7 pages).

\* cited by examiner

PIP_1,
PCR_1_1

IP_1,
CR_1_1

PIP_1,
PCR_2_1

IP_1,
CR_2_1

PIP_1,
PCR_3_1

IP_1,
CR_3_1

PIP_1,
PCR_4_1

IP_1,
CR_4_1

PIP_1,
PCR_5_1

IP_1,
CR_5_1

BLOOD ANALYSER WITH OUT-OF-FOCUS IMAGE PLANE ANALYSIS AND RELATED METHODS

This application is a national stage filing under 35 U.S.C. § 371 of International Application No. PCT/EP2021/087408 filed on Dec. 22, 2021, which claims priority to European Patent Application No. 20216605.4, filed on Dec. 22, 2020. The contents of these applications are each incorporated herein by reference in their entirety.

The present disclosure relates to blood sample analysis and related tools, methods, and systems in particular for determining one or more cell parameters. Thus, a blood analyser and related methods, in particular a method of analysing a blood sample is provided.

BACKGROUND

Today the analysis of a blood sample, such as determining a cell parameter, may be lengthy and require numerous steps, preparation, resources, and various advanced equipment. It may especially be lengthy and extensive to determine a blood count, such as a complete blood count.

SUMMARY

Accordingly, there is a need for blood analysers and related methods, in particular methods of analysing a blood sample with improved blood sample analysis, speed, and accuracy.

A blood analyser is disclosed. The blood analyser comprises a memory, an interface, and one or more processors. The blood analyser is configured to obtain image data of a prepared blood sample; select a first image associated with a first image plane of the prepared blood sample from the image data; characterize the first image, wherein the characterization of the first image comprises to determine a first set of cell regions belonging to the first image plane; select a first distal image associated with a first distal image plane on a distal side of the first image plane and/or select a first proximal image associated with a first proximal image plane on a proximal side of the first image plane, and determine a first distal set of distal cell regions associated with the first set of cell regions and/or determine a first proximal set of cell regions associated with the first set of cell regions; and determine a first cell parameter for each cell region of the first set of cell regions based on the first distal set of distal cell regions and/or the first proximal set of cell regions. Optionally, the image data comprising a stack of images where each image of the stack of images is associated with an image plane, wherein each image plane is associated with a different height along a z-axis of the prepared blood sample. Optionally, a cell region of the first set of cell regions comprises a group of pixels in the first image representing one or more cells, a part of a cell, parts of cells, or an optical phenomena relating to one or more cells. Optionally, a cell region of the first distal set of cell regions comprises a group of pixels in the first distal image representing one or more cells, a part of a cell, parts of cells, or an optical phenomena relating to one or more cells.

Further, a method of analysing a blood sample is disclosed, wherein the method comprises obtaining image data of a prepared blood sample; selecting a first image associated with a first image plane of the prepared blood sample from the image data; characterizing the first image, wherein the characterization of the first image comprises determining a first set of cell regions belonging to the first image plane;

selecting a first distal image associated with a first distal image plane on a distal side of the first image plane, and determining a first distal set of distal cell regions associated with the first set of cell regions; and determining a first cell parameter of the first set of cell regions based on the first distal set of distal cell regions. The method may be performed using a blood analyser as disclosed herein.

Also disclosed is a system comprising a microscope, an image acquiring device, a blood sample cavity for accommodating a prepared blood sample, and a blood analyser, wherein the blood analyser is a blood analyser according to the present disclosure.

It is an advantage of the present disclosure that an improved blood sample analysis is provided.

For example, a more efficient, precise, robust, and faster image-based cell parameter determination may be achieved, e.g. cell classification, such as the determination of a white blood cell, WBC, type, and/or a cell concentration in a blood sample. Further, an improved cell classification with higher accuracy is provided, and in particular improved cell analysis, such as white blood cell analysis.

It is an advantage of the present disclosure that it provides a more detailed, efficient, and faster blood sample analysis. The present disclosure may allow to analyse a blood sample being prepared with less chemicals, e.g. a blood sample being less diluted than prepared blood samples being analysed today. For example, it may be sufficient to dilute a blood sample with a reagent to a dilution ratio of 1:1 to 5:1, such as 2:1, of reagent:blood compared to the dilution ratio of 10,000:1 for analysing a blood sample today. It is an advantage of the present disclosure that less equipment, time, cost, and/or steps are required to analyse a blood sample. For example, it may be possible to determine cell parameters, such as classify cells, count cells, such as white blood cells, in one or few image planes. It is an advantage of the present disclosure that it may not be needed to analyse single cells through a narrow tube, such as flow cytometry or a coulter counter.

Instead, larger blood volumes may be examined or analysed. It is therefore an advantage of the present disclosure that a more robust system and/or method may be provided, for example avoiding clotting, requiring less maintenance than conventional systems, and having lower costs. It may therefore be possible to detect an anomaly in a blood sample in a faster and more efficient manner. Further, it may be easier to integrate the blood analysers, the systems, and/or the methods of the present disclosure into blood gas analysers.

BRIEF DESCRIPTION OF THE DRAWINGS

The above and other features and advantages of the present invention will become readily apparent to those skilled in the art by the following detailed description of example embodiments thereof with reference to the attached drawings, in which.

DETAILED DESCRIPTION

Figure 1:
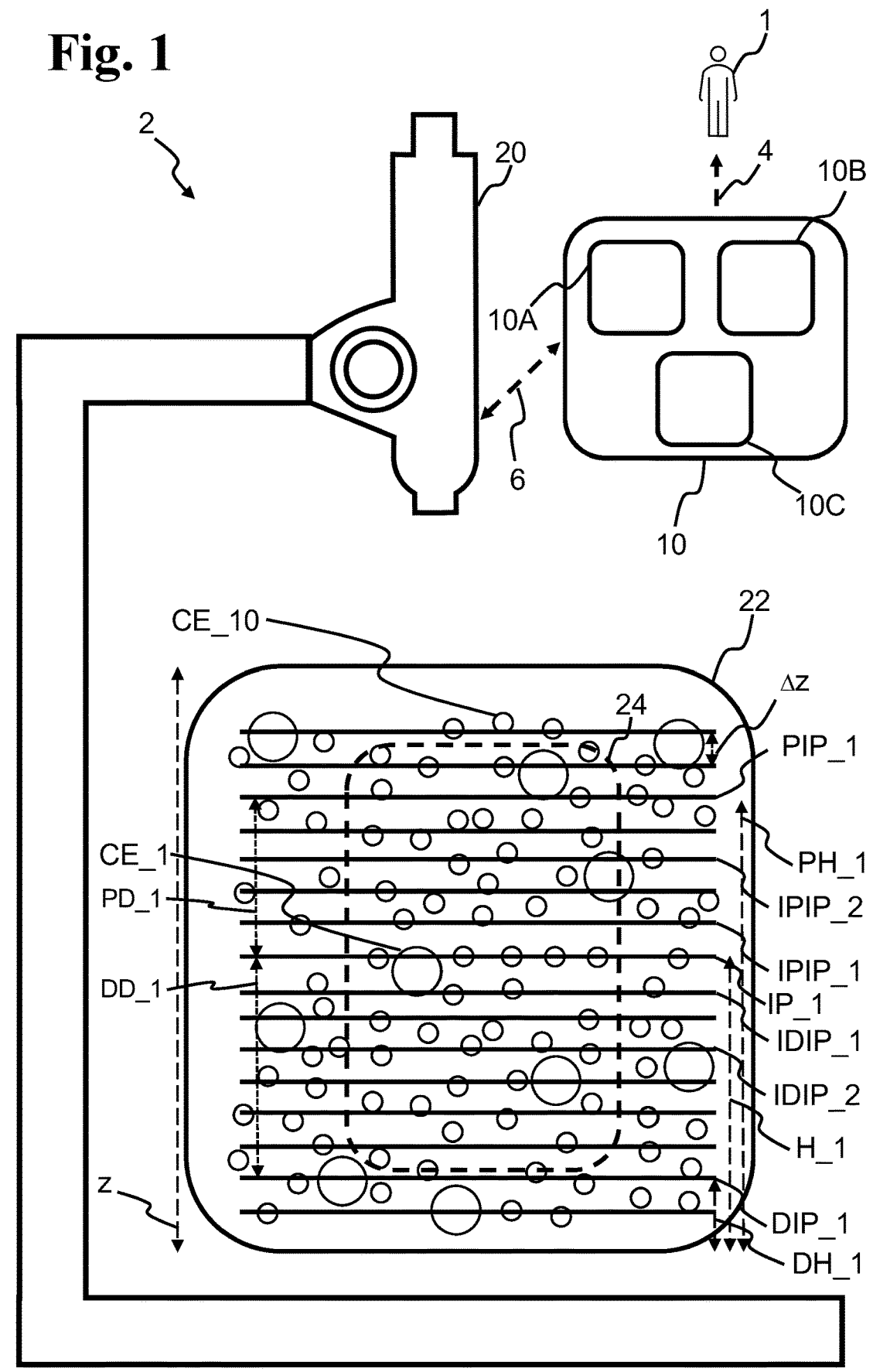
FIG. 1 schematically illustrates an example system comprising a blood analyser according to the present disclosure.

Various example embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

In the following, whenever referring to proximal side of an image plane, the referral is to the side closest to or the surface facing a camera or sensor (e.g. of a microscope), when an image is obtained/captured. Likewise, whenever referring to the distal side of an image plane, the referral is to the side furthest away from or the surface facing away from the camera or sensor, when an image is obtained/captured. In other words, the proximal side or surface is the side or surface closest to the camera or sensor, when an image is obtained/captured, and the distal side is the opposite side or surface with respect to the image plane. In other words, the distal side may be the side or surface closest to the bottom of a container containing the prepared blood sample when an image is obtained/captured.

A blood analyser is disclosed. The blood analyser comprises a memory, an interface, and one or more processors. The blood analyser may comprise an electronic device such as a computer, e.g. a laptop computer or PC, a tablet computer, and/or a mobile phone, such as a smartphone. The blood analyser may for example be a point of care (POC) device. The blood analyser may for example be configured to be integrated with a blood gas analyser. The blood analyser may for example be a user device, such as a computer or a mobile phone, configured to perform an analysis of a blood sample, such as a prepared blood sample. The blood analyser may for example be part of the equipment in a laboratory.

In one or more example blood analysers, the blood analyser is a server device, such as acting as a server device. In other words, the blood analyser may be seen as implemented on a server device, such as the blood analyser may be configured to run and/or operate on a server device. The blood analyser acting as server device may be seen as a device configured to act as a server in communication with a client device, such as a computer, e.g. a laptop computer or PC, a tablet computer, and/or a mobile phone, such as a smartphone. For example, the blood analyser may be a remote server device configured to communicate with a client device. The blood analyser acting as server device may for example be configured to perform any one or more of: obtaining image data, selecting a first image, characterizing the first image, selecting a first distal image, and determining a first cell parameter. The blood analyser acting as server device may for example be configured to output the first cell parameter to a client device.

The blood analyser is configured to obtain image data, also denoted ID, of a prepared blood sample. Image data may comprise one or more images, such as a plurality of images, e.g. a stack of images. The image data may comprise a plurality of images of the prepared blood sample obtained with a microscope and a camera, such as a CMOS image sensor camera. The image data may for example at least comprise ten images, at least twenty images, at least thirty images, at least forty images, at least fifty images, or at least a hundred images. The images of the image data may have an area depending on the area of the camera image sensor and a microscope magnification, e.g. $A=A\_im/M^2$, where A is the area of the captured image, M is the microscope magnification of the microscope, and A_im is the area that the camera image sensor may capture. The images of the image data may have a pixel size in the range of 0.1 μm to 5 μm, such as 0.5 μm, 1 μm, or 2 μm, depending on the resolution of the camera and/or the microscope. The image data may comprise a plurality of images of the prepared blood sample, where each image of the plurality of images is associated with an image plane of the prepared blood sample. The microscope and camera may obtain/acquire the plurality of images by stepping an optical focus plane along a z-axis, such as in a vertical direction of the prepared blood sample. The image data may therefore comprise a plurality of images being associated with images planes, where each image plane is separated by a distance Δz to the next obtained/acquired image plane and/or the previous obtained/acquired image plane. Δz may be the stepping incrementation for each obtained/acquired image. For example, the image data may comprise a plurality of images of the prepared blood sample, where each image may be associated with an image plane being equidistant from the next obtained/acquired image plane and/or the previous obtained/acquired image plane. In other words, the image data may comprise a 3D image stack, such as a stack of images where each image of the image stack is associated with an image plane having a different associated height along the z-axis of the prepared blood sample. In other words, each image plane may be associated with a unique height in the prepared blood sample contained in a container, e.g. the prepared blood sample contained in a cuvette. The distance between two image planes may be denoted inter-image distance. The distance between two image planes may vary, for example, depending on the type of cell of interest. The distance between two image planes may also, for example, vary depending on the numerical aperture, NA, and therefore also the depth of field, DoF, of the microscope which is used. This may be to achieve the best possible optical resolution.

The distance between two image planes may for example be in the range of 1 μm to 10 μm, such as in the range of 2 μm to 8 μm, in the range of 3 μm to 6 μm, in the range of 1 μm to 8 μm, and/or in the range of 1 μm to 6 μm, e.g., when the cell of interest is a platelet, e.g. since platelets have a diameter in the range of 1 μm to 5 μm, such as in the range of 2 μm to 3 μm. For example, the distance between two image planes may for example be 3 μm, 3.5 μm, 4 μm, 4.5 μm, 5 μm, 5.5 μm, 6 μm, 7 μm, 8 μm, 9 μm, and/or 10 μm. The distance between two image planes may for example be 5.04 μm, e.g. when the cell of interest is a platelet, e.g. since platelets have a diameter in the range of 1 μm to 5 μm, such as in the range of 2 μm to 3 μm. The image data may comprise a plurality of images of a central portion of the blood sample (such as the prepared blood sample). In other words, the image data may comprise a plurality of obtained/acquired images of the prepared blood sample representing areas or volumes of the prepared blood sample being located away from the edges of the container in which the prepared blood sample is contained. An advantage of having images of the prepared blood sample representing areas or volumes of the prepared blood sample being located away from the edges of the container in which the prepared blood sample is contained may be to avoid seeing the edges of the glass of the container, such as dirt on the glass of the container. In one or more example blood analysers, the image data, such as one or more images of the image data, may be cropped. For example, an image taken with a resolution of 20 megapixels may be cropped by cropping 20% of the side length of the field of view, FOV. The cropped image may be of a central portion of the blood sample, such as a reduced part of the FOV. A central portion of the blood sample may have the best optical resolution and have the least optical aberration. An advantage of using cropped images may be that a larger number of images may be selected from the image data. For example, substantially all the images of the image data may be selected, such as at least 20 images, at least 30 images, or at least 40 images. By selecting more images, it may be possible to compensate for an inaccurate distance travel in a focus mechanism (such as a mechanical delta Z movement) of a microscope.

Each image of the image data ID may comprise a plurality of representations. The plurality of representations may comprise a plurality of particles, such as cells, e.g. white blood cells, WBCs, platelets, red blood cells, RBCs, clots of blood components, cell debris, and/or external particles, e.g. dust, precipitation, or residues from the container or the like. The plurality of representations may comprise a plurality of cells, e.g. mature cells such as Reticulocytes, Lymphocytes, and/or Monocytes, segmented and band-shaped Granulocytes: Neutrophil, Eosinophil, and/or Basophil, and immature cells such as Normoblasts, erythroblasts, proerythroblasts, Metamyelocytes, Myelocytes, Promyelocytes, Myeloblasts, Monoblasts, and/or Lymphoblasts.

The prepared blood sample may comprise a blood sample prepared with one or more reagents, chemicals, treatments, and/or processes. The prepared blood sample may for example comprise a blood sample which has been stained, such as chemically stained. The prepared blood sample may for example comprise a blood sample which has been hemolyzed, for example wherein most of the red blood cells in the blood sample have been removed. The prepared blood sample may for example comprise a blood sample which has been positioned/fixed, such that substantially no cell movement occurs while obtaining/acquiring the images of the prepared blood sample. The prepared blood sample may be understood as a solution comprising blood and one or more reagents and/or chemicals. The prepared blood sample may be understood as a dissolution, e.g. a dissolved blood sample. The prepared blood sample may be placed/positioned in a container, such as a cuvette, while the image data, e.g. the plurality of images of the prepared blood sample, is obtained/acquired. The height that the image planes are associated with may be a height or distance, e.g. on the z-axis, with respect to the bottom of the container/cuvette or with respect to the camera/microscope, when the image was obtained/captured. The image planes that the plurality of images may extend in a two dimensional plane, e.g. a x-y-plane perpendicular with respect to the z-axis.

The blood analyser is configured to select an image, also denoted $I\_i$, where i is the number of the selected image, associated with an image plane, also denoted $IP\_i$, of the prepared blood sample from the image data ID. The blood analyser may be configured to select a first image, also denoted $I\_1$, associated with a first image plane $IP\_1$ of the prepared blood sample from the image data ID. In other words, to select an image $I\_i$ may comprise to select a first image $I\_1$ associated with a first image plane $IP\_1$ of the prepared blood sample from the image data ID. The first image $I\_1$ may be selected from a plurality of images obtained from the image data ID. Optionally, the blood analyser may be configured to select a second image $I\_2$, a third image $I\_3$, a fourth image $I\_4$, and/or a fifth image $I\_5$. In one or more example blood analysers, the blood analyser may be configured to select more images, such as ten images, twenty images, or more. The images selected from the image data may be selected from a set of images, e.g. at least 20 images each associated with an image plane of the prepared blood sample. To select image data may comprise to populate a data set with one or more images of the prepared blood sample, e.g., to provide a stack of images. Each image of the stack of images may be associated with an image plane having a different associated height along a z-axis of the prepared blood sample.

In one or more example blood analysers, the first image plane is associated with a first height, also denoted $H\_1$, in the prepared blood sample. The first height that the first image plane is associated with may be a height, e.g. on the z-axis, with respect to the bottom of the container/cuvette or with respect to the camera/microscope, when the first image was obtained/captured.

The blood analyser is configured to characterize the image $I\_i$. In one or more example blood analysers, the characterization of the image $I\_i$ comprises to determine a set of cell regions, also denoted $SCR\_i$ belonging to the image plane $IP\_i$. A cell region, also denoted $CR\_k\_i$, $k=1, 2, \ldots K$, where K is the number of cell regions in the set of cell regions $SCR\_i$ and where i is the number of the selected image, may be understood as a group of pixels in the image $I\_i$ representing one or more cells, a part of a cell, parts of cells, or an optical phenomena relating to a cell or a plurality of cells. In other words, the set of cell regions $SCR\_i$ comprises one or more cell regions, e.g. one or more group of pixels in the image $I\_i$ representing one or more cells, one or more parts of one or more cells, or optical phenomena relating to one or more cells. A cell region may preferably represent a single cell, a part of a single cell, or an optical phenomenon relating to a single cell.

The blood analyser may be configured to characterize the first image $I\_1$. In one or more example blood analysers, the characterization of the first image $I\_1$ comprises to determine a first set of cell regions $SCR\_1$ belonging to the first image plane $IP\_1$. In other words, to characterize the image $I\_i$ may comprise to characterize the first image $I\_1$. In other words, to determine a set of cell regions $SCR\_i$ belonging to the image plane $IP\_i$ may comprise to determine a first set of cell regions $SCR\_1$ belonging to the first image plane $IP\_1$. In other words, to determine a set of cell regions $SCR\_i$ belonging to the image plane $IP\_i$ may comprise to determine a first set of cell regions $SCR\_1$ being in focus in or associated with the first image plane $IP\_1$. In other words, the first set of cell regions $SCR\_1$ may comprise one or more cell regions, e.g. one or more groups of pixels in the first image $I\_1$ representing one or more cells, one or more parts of one or more cells, or optical phenomena relating to one or more cells. In one or more example blood analysers, to determine a set of cell regions $SCR\_i$ may comprise to populate of data set with one or more cell regions associated with a group of pixels in the image $I_i$ representing one or more cells, a part of a cell, parts of cells, or an optical phenomena relating to a cell or a plurality of cells.

Belonging to the image plane $IP\_i$, such as belonging to the first image plane $IP\_1$, may be understood as cell regions $CR\_k$ representing cells (e.g. the volume of the cell) being located mostly in the image plane $IP\_i$, at the time when the image was obtained/captured, or cell regions being assigned to or in focus in an image plane. For example, belonging to the image plane IP_i may be understood as cell regions CR_k representing cells being located mostly in the volume around the image plane IP_i, such as centred around the image plane IP_i. For example, belonging to the image plane IP_i may be understood as cell regions CR_k representing cells being located in the volume around the image plane IP_i. The distance between two image planes, such as the first distal distance also denoted DD_1 between the first image plane IP_1 and the first distal image plane DIP_1, and a first proximal distance also denoted PD_1 between the first image plane IP_1 and the first proximal image plane PIP_1 may be in the range from 1 µm to 10 µm, such as in the range of 2 µm to 8 µm, in the range of 3 µm to 6 µm, in the range of 1 µm to 8 µm, and/or in the range of 1 µm to 6 µm, e.g., when the cell of interest is a platelet, e.g. since platelets have a diameter in the range of 1 µm to 5 µm, such as in the range of 2 µm to 3 µm. For example, a first distal distance DD_1 between the first image plane IP_1 and the first distal image plane DIP_1, and a first proximal distance also denoted PD_1 between the first image plane IP_1 and the first proximal image plane PIP_1 may for example be 3 µm, 3.5 µm, 4 µm, 4.5 µm, 5 µm, 5.5 µm, 6 µm, 7 µm, 8 µm, 9 µm, and/or 10 µm, e.g. when the cell of interest is a platelet, e.g. since platelets have a diameter in the range of 1 µm to 5 µm. For example, when the distance D between the image plane IP_i and the next neighbouring image plane is 5.04 µm, the belonging to the image plane IP_i may be understood as cell regions CR_k representing cells being located in the volume +2.02 µm and −2.02 µm around the image plane IP_i. Belonging to the image plane IP_i may be understood as cell regions CR_k representing cells being located in the volume between the image plane IP_i and the next neighbouring image plane, e.g. the next neighbouring distal image plane and/or the next neighbouring proximal image plane. In one or more example blood analysers, a set of cell regions may extend in more than one image plane. For example, when a cell region represents a cell larger than the distance between two image planes, the cell may extend to more than one image plane. In one or more example blood analysers, a set of cell regions may be assigned to an image plane, such as the first image plane IP_1. In one or more example blood analysers, the distance between two neighbouring image planes may be based on the size of a cell type of interest, e.g. to make sure that a cell belongs to an image plane. For example, a white blood cell having a diameter in the range e.g. of 5 µm to 10 µm may belong to two image planes.

In one or more example blood analysers, the blood analyser is configured to select, e.g. from the image data ID, a distal image, also denoted DI_i, where i is the number of the selected distal image, associated with a distal image plane, also denoted DIP_i on a distal side of the image plane IP_i. To select a distal image DI_i may comprise to select a first distal image DI_1 associated with a first distal image plane DIP_1, on a distal side of the first image plane IP_1. In other words, the distal image DI_i may comprise a first distal image DI_1. The distal side may be understood as the side or surface closest to the bottom of a container containing the prepared blood sample when the distal image is obtained/captured. In one or more example blood analysers, the blood analyser is configured to characterize the first distal image DI_1. The distal image plane DIP_i may also be denoted an out of focus plane, because it may be the image plane where a distal cell region DCR_p_i may represent a cell being out of focus in the distal image DI_i.

In one or more example blood analysers, the blood analyser is configured to determine a distal set of distal cell regions, also denoted DSCR_i, where i is the number of the selected distal image, associated with the set of cell regions SCR_i. To determine a distal set of distal cell regions DSCR_i associated with the set of cell regions SCR_i may comprise to determine a first distal set of distal cell regions DSCR_1 associated with the first set of cell regions SCR_1. To determine a distal set of distal cell regions DSCR_i associated with the set of cell regions SCR_i may comprise to determine distal cell regions, also denoted DCR_k_i, k=1, 2, . . . K, where K is the number of distal cell regions in the distal set of cell regions DSCR_i and where i is the number of the selected distal image, associated with the cell regions CR_k_i. To determine a distal set of distal cell regions DSCR_i associated with the set of cell regions SCR_i may comprise for each respective cell region CR_k_i of the set of cell regions SCR_i to determine a bounding area, such as a bounding box, around the respective cell region CR_k_i. In one or more example blood analysers, a bounding area or bounding box may be determined by enlarging a corresponding cell region in the distal image plane DIP_i and/or the proximal image plane PIP_i, e.g. in order to encompass the distal cell region DCR_k_i and/or the proximal cell region PCR_k_i. For example, the bounding area or bounding box may be determined by using a dilation technique, where a plurality of pixels are added, e.g. to the edges of the cell region CR_k_i. In other words, to determine a distal set of distal cell regions DSCR_i associated with the set of cell regions SCR_i may comprise for each respective cell region CR_k_i of the set of cell regions SCR_i to determine a larger area of pixels in the distal image DI_i than in the image I_i, in order to encompass a pixel area in the distal image DI_i corresponding to a pixel area of the cell region CR_k_i in the image I_i. In one or more example blood analysers, a center coordinate of the bounding box may be determined, for example to determine whether the corresponding cell region of the distal set of distal cell regions DSCR_i is shifted with respect to the cell region of the set of cell regions SCR_i. An optical phenomenon may for example shift the corresponding cell region of the distal set of distal cell regions DSCR_i in one or more directions in the x-y plane with respect to the cell region of the set of cell regions SCR_i. A distal cell region DCR_k_i of the distal set of distal cell regions DSCR_i may comprise a representation of the same cell represented by the respective cell region CR_k_i of the set of cell regions SCR_i. A distal cell region DCR_k_i of the distal set of distal cell regions DSCR_i may have an area larger or smaller than the corresponding cell region of the set of cell regions SCR_i. For example, a distal cell region DCR_k_i of the distal set of distal cell regions DSCR_i may have a larger or smaller number of pixels than the corresponding cell region CR_k_i of the set of cell regions SCR_i, e.g. due to an optical effect in the distal cell region DCR_k_i in the distal image plane DIP_i. By determining a bounding area for the distal cell region DCR_k_i of the distal set of distal cell regions DSCR_i e.g. the bounding area having an area larger than the area of the corresponding cell region CR_k_i, it may be ensured that the whole area of the distal cell region DCR_k_i corresponding to the cell region CR_k_i is identified.

In one or more example blood analysers, the first distal image plane DIP_1 is associated with a first distal height DH_1 in the prepared blood sample. The first distal height DH_1 that the first distal image plane DIP_1 is associated with may be a distal height, e.g. on the z-axis, with respect to the bottom of the container/cuvette or with respect to the camera/microscope, when the first distal image was obtained/captured. The first distal height DH_1 is different from the first height H_1. In other words, the distance between the first image plane IP_1 and the first distal image plane DIP_1 may be denoted as $\Delta z$ being the stepping incrementation for each obtained/acquired image when the first distal image plane DIP_1 is the image plane right after the first image plane IP_1 with respect to the camera, i.e. the direct distal neighbouring image plane with respect to the first image plane IP_1. In one or more example blood analysers, the distance between the first image plane IP_1 and the first distal image plane DIP_1 may be larger than $\Delta z$, e.g. $2 \cdot \Delta z$, $3 \cdot \Delta z$, $4 \cdot \Delta z$, or $5 \cdot \Delta z$, for example when the first distal image plane DIP_1 is an image plane after the first image plane IP_1 with respect to the camera but not the direct distal neighbouring image plane with respect to the first image plane IP_1, i.e. the first distal image plane DIP_1 being more than one image plane away from the first image plane IP_1. In one or more example blood analysers, the distance between the first image plane IP_1 and the first distal image plane DIP_1 may be in the range from 2.5 µm to 75 µm, such as in the range from 20 µm to 55 µm. A first distal distance also denoted DD_1 between the first image plane IP_1 and the first distal image plane DIP_1, and a first proximal distance also denoted PD_1 between the first image plane IP_1 and the first proximal image plane PIP_1 may be in the range from 1 µm to 10 µm, such as in the range of 2 µm to 8 µm, in the range of 3 µm to 6 µm, in the range of 1 µm to 8 µm, and/or in the range of 1 µm to 6 µm, e.g., when the cell of interest is a platelet, e.g. since platelets have a diameter in the range of 1 µm to 5 µm, such as in the range of 2 µm to 3 µm. For example, a first distal distance DD_1 between the first image plane IP_1 and the first distal image plane DIP_1, and a first proximal distance also denoted PD_1 between the first image plane IP_1 and the first proximal image plane PIP_1 may for example be 3 µm, 3.5 µm, 4 µm, 4.5 µm, 5 µm, 5.5 µm, 6 µm, 7 µm, 8 µm, 9 µm, and/or 10 µm.

The blood analyser is configured to determine a first cell parameter, also denoted CP_k_i, where i is the number of the selected image and k is the number of the cell region, for each cell region CR_k_i of the set of cell regions SCR_i based on the distal set of distal cell regions DSCR_i and/or the proximal set of proximal cell regions PSCR_i. In one or more example blood analysers, the blood analyser is configured to determine a first cell parameter CP_k_1 for each cell region of the first set of cell regions SCR_1 based on the first distal set of distal cell regions DSCR_1 and/or the first proximal set of proximal cell regions PSCR_1. To determine a first cell parameter CP_k_1 of a cell region CR_k_i may be based on a distal cell region DCR_k_i associated with the cell region CR_k_i. To determine a first cell parameter CP_k_1 of a first cell region CR_k_1 may be based on a first distal cell region DCR_k_1. A distal image DI_i may be selected in order to determine whether optical phenomena are present in the distal image DI_i, such as in the distal set of distal cell regions DSCR_i. For example, when a white blood cell is analysed, the white blood cell may comprise a nucleus being light absorbing and cytoplasm having a weak light absorption. When a cell region CR_k_i of the WBC has a large part of cytoplasm, a lens effect (optical phenomenon/effect) may occur which generates a bright area in the distal image plane DIP_i and/or proximal image plane PIP_i and may be observed in the distal cell region DCR_k_i and/or the proximal cell region PCR_k_i associated with the cell region CR_k_i. For example, an optical phenomenon of a bright area, e.g. bright spot, may occur in a proximal image plane PIP_i being on the proximal side, which is closest to the camera. This may occur when a mixture, such as the prepared blood sample, has a refractive index lower than a refractive index of a cell represented by the cell region. For example, an optical phenomenon of a dark area, e.g. dark spot, may occur in a distal image plane DIP_i being on the distal side, which is furthest from the camera. Optionally, when a mixture, such as the prepared blood sample, has a refractive index higher than a refractive index of a cell represented by the cell region, the optical phenomena of the bright area and the dark area may be inverted. In one or more example blood analysers, a bright spot detection may be performed and/or measured in a neighbouring image plane of the first image plane IP_1. For example, a bright spot detection may be performed and/or measured in an image plane at least one, two, three, five and/or ten image planes away from the first image plane IP_1. In other words, a bright spot detection may be performed and/or measured in the first distal image plane DIP_1 and/or the first proximal image plane PIP_1 being at least one, two, three, five and/or ten image planes away from the first image plane IP_1. For example, a bright spot detection may be performed and/or measured in the first distal image plane DIP_1 and/or the first proximal image plane PIP_1 being three image planes away from the first image plane IP_1. A bright spot may be detected, measured, and/or identified as a maximum positive contrast compared with the background intensity. For detecting a bright spot a bright spot criterion may be applied. The bright spot criterion may comprise a bright spot threshold, e.g., the bright spot threshold being of at least 15 count in intensity compared to the background. A background of an image may typically be of 200 count in intensity.

For example, when a platelet cell is analysed, the platelet may be weak light absorbing in general. A lens effect (optical phenomenon/effect) may also occur when analysing a platelet which generates a bright area, such as a white dot, in the distal image plane DIP_i and/or proximal image plane PIP_i and may be observed in the distal cell region DCR_k_i and/or the proximal cell region PCR_k_i associated with the cell region CR_k_i. Other particles in the size range of platelets (1 µm to 5 µm) do not generate a lens effect. The platelets and other particles in the same size range can therefore be differentiated. For example, particles like reticulocyte nucleus fragments and reagent crystalline deposits may not produce a bright spot, and may thereby be differentiated from a platelet cell producing a bright spot. Bright spot detection may be used to sort, filter, and/or suppress unwanted particles from the prepared blood sample.

A lens effect (optical phenomenon/effect) may also occur when analysing a red blood cell which may be used for detecting/classifying RBCs. An advantage of analysing RBC may be that RBC that have not been lysed and may be detected and for example be discarded or classified as RBCs.

To determine a first cell parameter CP_k_1 may comprise to classify a first cell CE_1_$i$ associated with or represented by the first cell region CR_k_1 based on the first distal cell region DCR_k_1. The first cell parameter CP_k_1 may for example comprise cell type information. To determine a first cell parameter CP_k_1 may comprise to classify a first cell CE_1_$i$ associated with or represented by the first cell region CR_k_1 based on optical phenomena in the first distal cell region DCR_k_1. To determine a first cell parameter CP_k_1 may comprise to classify a first cell CE_1_$i$ associated with or represented by the first cell region CR_k_1 based on information determined from the first distal cell region DCR_p_1.

In one or more example blood analysers, the determination of the set of cell regions SCR_i is based on the distal image DI_i. In other words, the determination of the first set of cell regions SCR_1 may be based on the first distal image DI_1.

In one or more example blood analysers, the blood analyser is configured to select, from the image data ID, a proximal image, also denoted PI_i, where i is the number of the selected proximal image, associated with a proximal image plane, also denoted PIP_i, on a proximal side of the image plane IP_i. To select a proximal image PI_i may comprise to select a first proximal image PI_1 associated with a first proximal image plane PIP_1, on a proximal side of the first image plane IP_1. In other words, the proximal image PI_i may comprise a first proximal image PI_1. The proximal side may be understood as the side or surface closest to or facing a camera or sensor when the proximal image is obtained/captured. In one or more example blood analysers, the blood analyser is configured to characterize the first proximal image PI_1. In one or more example blood analysers, the blood analyser is configured to determine a proximal set of proximal cell regions, also denoted PSCR_i, where i is the number of the selected proximal image, associated with the set of cell regions SCR_i. To determine a proximal set of proximal cell regions PSCR_i associated with the set of cell regions SCR_i may comprise to determine a first proximal set of proximal cell regions PSCR_1 associated with the first set of cell regions SCR_1. To determine a proximal set of proximal cell regions PSCR_i associated with the set of cell regions SCR_i may comprise to determine proximal cell regions, also denoted PCR_k_i, k=1, 2, . . . K, where K is the number of proximal cell regions in the proximal set of cell regions PSCR_i and where i is the number of the selected proximal image, associated with the cell regions CR_k_i. To determine a proximal set of proximal cell regions PSCR_i associated with the set of cell regions SCR_i may comprise for each respective cell region CR_k_i of the set of cell regions SCR_i to determine a bounding area, such as a bounding box, around the respective cell region CR_k_i. In one or more example blood analysers, a bounding area or bounding box may be determined by enlarging a corresponding cell region in the proximal image plane PIP_i, e.g. in order to encompass the proximal cell region PCR_k_i. For example, the bounding area or bounding box may be determined by using a dilation technique, where a plurality of pixels are added, e.g. to the edges of the cell region CR_k_i. In other words, to determine a proximal set of proximal cell regions PSCR_i associated with the set of cell regions SCR_i may comprise for each respective cell region CR_k_i of the set of cell regions SCR_i to determine a larger area of pixels in the proximal image PI_i than in the image I_i, in order to encompass a pixel area in the proximal image PI_i corresponding to a pixel area of the cell region CR_k_i in the image I_i. In one or more example blood analysers, a center coordinate of the bounding box may be determined, for example to determine whether the corresponding cell region of the proximal set of proximal cell regions PSCR_i is shifted with respect to the cell region of the set of cell regions SCR_i. An optical phenomenon may for example shift the corresponding cell region of the proximal set of proximal cell regions PSCR_i in one or more directions in the x-y plane with respect to the cell region of the set of cell regions SCR_i. A proximal cell region PCR_k_i of the proximal set of proximal cell regions PSCR_i may comprise a representation of the same cell represented by the respective cell region CR_k_i of the set of cell regions SCR_i. A proximal cell region PCR_k_i of the proximal set of proximal cell regions PSCR_i may have an area larger or smaller than the corresponding cell region of the set of cell regions SCR_i. For example, a proximal cell region PCR_k_i of the proximal set of proximal cell regions PSCR_i may have a larger or smaller number of pixels than the corresponding cell region CR_k_i of the set of cell regions SCR_i, e.g. due to an optical effect in the proximal cell region PCR_k_i in the proximal image plane PIP_i. By determining a bounding area for the proximal cell region PCR_k_i of the proximal set of proximal cell regions PSCR_i e.g. the bounding area having an area larger than the area of the corresponding cell region CR_k_i, it may be ensured that the whole area of the proximal cell region PCR_k_i corresponding to the cell region CR_k_i is identified. The proximal image plane PIP_i may also be denoted an out of focus plane, because it may be the image plane where a proximal cell region PCR_p_i may represent a cell being out of focus in the proximal image PI_i.

In one or more example blood analysers, the first proximal image plane PIP_1 is associated with a first proximal height PH_1 in the prepared blood sample. The first proximal height PH_1 that the first proximal image plane PIP_1 is associated with may be a proximal height, e.g. on the z-axis, with respect to the bottom of the container/cuvette or with respect to the camera/microscope, when the first proximal image was obtained/captured. The first proximal height PH_1 is different from the first height H_1. In other words, the distance between the first image plane IP_1 and the first proximal image plane PIP_1 may be denoted as $\Delta z$ being the stepping incrementation for each obtained/acquired image when the first proximal image plane PIP_1 is the image plane just prior to the first image plane IP_1 with respect to the camera, i.e. the direct proximal neighbouring image plane with respect to the first image plane IP_1. In one or more example blood analysers, the distance between the first image plane IP_1 and the first proximal image plane PIP_1 may be larger than $\Delta z$, e.g. $2 \cdot \Delta z$, $3 \cdot \Delta z$, $4 \cdot \Delta z$, or $5 \cdot \Delta z$, for example when the first proximal image plane PIP_1 is an image plane prior to the first image plane IP_1 with respect to the camera but not the direct proximal neighbouring image plane with respect to the first image plane IP_1, i.e. the first proximal image plane PIP_1 being more than one image plane away from the first image plane IP_1. In one or more example blood analysers, the distance between the first image plane IP_1 and the first proximal image plane PIP_1 may be in the range from 5 μm to 75 μm, such as in the range from 20 μm to 55 μm.

In one or more example blood analysers, the determination of the set of cell regions SCR_i is based on the proximal image PI_i. In other words, the determination of the first set of cell regions SCR_1 may be based on the first proximal image PI_1.

In one or more example blood analysers, the blood analyser is configured to select an intermediate distal image, also denoted IDI_i, where i is the number of the intermediate distal image, associated with an intermediate distal image plane, also denoted IDIP_i, where i is the number of intermediate distal image plane, on a distal side of the image plane IP_i. To select an intermediate distal image IDI_i associated with an intermediate distal image plane IDIP_i may comprise to select a primary intermediate distal image IDI_1 associated with a primary intermediate distal image plane IDIP_1. An intermediate distal image plane IDIP_i may be comprised between the image plane IP_i and the distal image plane DIP_i. There may for example be a plurality of intermediate distal image planes IDI_i between the image plane IP_i and the distal image plane DIP_i, such that the distal image plane DIP_i is e.g. at least two image planes from the image plane IP_i, at least three image plane from the image plane IP_i, at least four image plane from the image plane IP_i, at least five image plane from the image plane IP_i, or at least ten image plane from the image plane IP_i.

In one or more example blood analysers, the blood analyser is configured to determine an intermediate distal set of distal cell regions, also denoted IDSCR_i where i is the number of the intermediate distal image, associated with the set of cell regions SCR_i. To determine an intermediate distal set of distal cell regions IDSCR_i associated with the set of cell regions SCR_i may comprise to determine a primary intermediate distal set of distal cell regions IDSCR_1 associated with the first set of cell regions SCR_1. In one or more example blood analysers, the first cell parameter CP_k_1 for each cell region CR_k_i of the set of cell regions SCR_i is based on the intermediate distal set of distal cell regions IDSCR_i. The first cell parameter CP_k_1 for each cell region CR_k_i of the first set of cell regions SCR_1 may be based on the primary intermediate distal set of distal cell regions IDSCR_1. An intermediate distal image IDI_i may be selected in order to determine whether optical phenomena are present in the intermediate distal set of distal cell regions IDSCR_i or if the next intermediate distal image IDI_i shall be selected. The next intermediate distal image IDI_i may e.g. be the distal image DI_i.

In one or more example blood analysers, to select a distal image DI_i, such as a first distal image DI_1, is based on the intermediate distal set of distal cell regions IDSCR_i, such as the primary intermediate distal set of distal cell regions IDSCR_1.

In one or more example blood analysers, the blood analyser is configured to select a primary intermediate proximal image IPI_1 associated with a primary intermediate proximal image plane IPIP_1 on a proximal side of the first image plane IP_1, and to determine a primary intermediate proximal set of proximal cell regions IPSCR_1 associated with the first set of cell regions SCR_1, and wherein the first cell parameter CP_k_i for each cell region CR_k_i of the first set of cell regions SCR_1 is based on the primary intermediate proximal set of proximal cell regions IPSCR_1. The description of the intermediate distal set of distal cell regions may also apply to the intermediate proximal set of distal cell regions.

An intermediate distal image plane IDIP_i may not necessarily be the direct neighbouring image plane to the image plane IP_1. The blood analyser may be configured to skip one or more image planes when selecting an intermediate distal image plane IDIP_i.

In one or more example blood analysers, the determination of the first cell parameter CP_k_i for each cell region CR_k_i of the first set of cell regions SCR_1 is based on a plurality of intermediate distal set of distal cell regions of a plurality of intermediate distal image planes and/or intermediate proximal set of proximal cell regions of a plurality of intermediate proximal image planes.

In one or more example blood analysers, the blood analyser is configured to select a distal image and/or a proximal image associated respectively with a distal image plane and a proximal image plane being located beyond respectively the distal image DI_i and/or the proximal image PI_i, to determine whether a distal cell parameter and/or a proximal cell parameter determined based on the distal image DI_i and/or the proximal image PI_i are better than the distal cell parameter and/or a proximal cell parameter determined based on the distal image and/or a proximal image associated respectively with a distal image plane and a proximal image plane being located beyond respectively the distal image DI_i and/or the proximal image PI_i. Being located beyond respectively the distal image DI_i and/or the proximal image PI_i may be understood as located respectively on a distal side of the distal image plane DIP_i and on a proximal side of the proximal image plane PIP_i.

In one or more example blood analysers, the blood analyser/processor comprises a classification circuitry configured to operate according to one or more classification models. In one or more example blood analysers, the determination of the first cell parameter CP_k_1 comprises to classify each distal cell region DCR_k_i of the first distal set of distal cell regions DSCR_1 and/or each proximal cell region PCR_k_i of the first proximal set of proximal cell regions PSCR_1. To classify each distal cell region DCR_k_i may comprise to determine whether each distal cell region DCR_k_i of the first distal set of distal cell regions DSCR_1 satisfies one or more criteria, such as one or more features, of the classification model. To classify each distal cell region DCR_k_i may comprise to determine a cell type of each distal cell region DCR_k_i based on the classification model. The classification circuitry may be configured to extract one or more features from each distal cell region DCR_k_i. The extracted features may be fed as input to the classification model. The classification circuitry may comprise a neural network comprising one or a plurality of hidden layers. Each layer of the neural network may comprise one or more nodes. For example, the classification of each distal cell region DCR_k_i may comprise to compare an optical phenomenon present in a distal cell region DCR_k_i with one or more model cell regions comprising optical phenomena known to represent certain types of cells. The classification model may be a neural network with an input layer, one or more hidden layers, such as a plurality of hidden layers, and an output layer. The input to the classification model may comprise a cell region or a plurality of cell regions. In one or more example blood analysers, the classification circuitry comprises a neural network for each cell type, such as cell class, the output layer of the neural network may therefore have one node. In one or more example blood analysers, the blood analyser/processor comprises a neural network for all the cell types of interest. The output layer of the neural network may thereby have one node for each cell type or class. The output layer may be connected to the last hidden layer.

The neural network may comprise a first hidden layer after the input layer. The input layer may be connected to the first hidden layer. The input layer may comprise as many nodes as the length, e.g. number of components, of the feature vector. The first hidden layer may comprise at least 3 nodes, such as at least 20 nodes. In one or more example neural networks, the first hidden layer comprises in the range from 8 to 100 nodes, or in the range from 100 to 1,000 nodes, such as in the range from 200 to 500 nodes, e.g. about 300 nodes. In one or more example neural networks, the neural network comprises a second hidden layer after the first hidden layer. The second hidden layer may comprise at least 5 nodes, such as at least 20 nodes. The second hidden layer optionally comprises in the range from 100 to 1,000 nodes, such as in the range from 8 to 100 nodes, or in the range from 200 to 500 nodes, e.g. about 300 nodes. In one or more example neural networks, the neural network has less than 10 hidden layers, such as less than 5 hidden layers. The output/output layer of the neural network may comprise one or more output variables, such as at least 5 output variables. In one or more example neural networks, the number of output variables is in the range from 6 to 15.

In one or more example blood analysers, the determination of the first cell parameter CP_k_1 comprises to determine a first distal cell parameter DCP_p_i, where i is the number of the selected distal image and p is the number of the distal cell region, for each distal cell region DCR_p_i of the distal set of distal cell regions DSCR_i. In one or more example blood analysers, the first cell parameter CP_k_1 is based on the first distal cell parameter DCP_p_1 for the associated distal cell regions DCR_p_i of the first distal image plane DIP_1. To determine a first distal cell parameter DCP_p_1 may comprise to determine additional information on the first cell region CR_k_i in the associated distal cell region DCR_k_i. In other words, additional information on a cell belonging to the first image plane IP_1 may be determined in the first distal image plane DIP_1. The first distal cell parameter DCP_p_1 may comprise a probability or a score that the cell region CR_k_i represents a certain type of cell.

In one or more example blood analysers, the determination of the first cell parameter CP_k_1 comprises to determine a first proximal cell parameter PCP_p_i, where i is the number of the selected proximal image and p is the number of the proximal cell region, for each proximal cell region PCR_p_i of the first proximal set of proximal cell regions PSCR_i. In one or more example blood analysers, the first cell parameter CP_k_1 is based on the first proximal cell parameter PCP_p_1 for the associated first proximal cell regions PCR_p_1 of the first proximal image plane PIP_1. To determine a first proximal cell parameter PCP_p_1 may comprise to determine additional information on the first cell region CR_k_i in the associated proximal cell region PCR_p_i. In other words, additional information on a cell belonging to the first image plane IP_1 may be determined in the first proximal image plane PIP_1. The first proximal cell parameter PCP_p_1 may comprise a probability or a score that the cell region CR_k_i represents a certain type of cell.

In one or more example blood analysers, the first distal cell parameter DCP_k_1 and/or the first proximal cell parameter PCP_p_1 may comprise out-of-focus features, e.g. from the first distal image DI_1 and/or the first proximal image PI_1. The first distal cell parameter DCP_k_1 and/or the first proximal cell parameter PCP_p_1 may be combined with the first cell parameter CP_k_1, such as in-focus features, from the first image I_1. In other words, information from all relevant image planes may be used to classify the type of cells. The first cell parameter CP_k_1 may comprise optical phenomenon, such as a bright spot intensity (negative contrast), a size of the bright spot, and/or intensity variations that may be associated with certain cell types. The first distal cell parameter DCP_k_1 and/or the first proximal cell parameter PCP_p_1 may comprise one or more of a circularity, a mean pixel intensity of nucleus and/or cytoplasm, a number of lobes of nucleus, and a feature reflecting curvature of the cell membrane.

In one or more example blood analysers, the first distal cell parameter DCP_p_1 and/or the first proximal cell parameter PCP_p_1 comprises one or more of a colour/contrast parameter, a geometry parameter, a morphology parameter, and a cell classification/type parameter. In one or more example blood analysers, the first distal cell parameter DCP_p_1 and/or the first proximal cell parameter PCP_p_1 comprises information indicative of cell movement, e.g. in the cell region CR_k_i. In one or more example blood analysers, the first distal cell parameter DCP_p_1 and/or the first proximal cell parameter PCP_p_1 comprises information for determining one or more of a volume of a cell, a content of a cell, a shape of a cell, a rotation of a cell, a segmentation of a cell (such as segmented in blobs), or a contrast of a cell.

The blood analyser is configured to determine a first blood parameter, also denoted BP_1, of the prepared blood sample based on the first cell parameter CP_k_1. To determine a first blood parameter BP_1 may comprise to determine a first number of cell regions in the first set of cell regions SCR_1, where the first blood parameter BP_1 is based on the first number of cell regions. The first blood parameter may comprise one or more cell counts, such as a white blood cell count and/or a platelet count. The first blood parameter may comprise one or more cell concentrations, such as a white blood cell concentration and/or a platelet concentration. The first blood parameter may comprise a white blood cell count or white blood cell concentration of different types of white blood cells, such as a count or concentration of Basophil, Eosinophil, Lymphocyte, Monocyte, Neutrophil, and/or plastic beads. The first blood parameter may comprise a 3-part WBC DIFF and/or a 5-part WBC DIFF.

To determine a first blood parameter BP_1 may comprise to count the number, also denoted C_i, where i is the number of the selected image plane, of cell regions CR_k_i in one or more sets of cell regions SCR_i. To determine a first blood parameter BP_1 may comprise to count the number of cell regions CR_k_i in one or more image planes IP_i, such as the first image plane IP_1, the second image plane IP_2, the third image plane IP_3, the fourth image plane IP_4, and/or the fifth image plane IP_5. When the number of cell regions CR_k_i have been counted for more than one set of cell regions SCR_i, e.g. for more than one image plane IP_i, the result of the count of cell regions may be averaged based on the number of set of cell regions SCR_i. Belonging to the image plane IP_i, such as belonging to the first image plane IP_1, may be understood as belonging to a volume V located between the image plane IP_i and the next neighbouring distal image plane DIP_i and/or the next neighbouring proximal image plane PIP_i. A volume V between two image planes, may for example be in the range of 2 nL to 50 nL, such as in the range of 3 nL to 25 nL, e.g. 3.22 nL for a colour system (using an RGB colour camera) or 4.06 nL for a monochrome system (using a monochrome camera with monochrome light source and with no RGB filters). The volume V may be defined as $V = D \cdot A$, where D is the distance from the image plane IP_i and the next neighbouring distal image plane DIP_i and/or the next neighbouring proximal image plane PIP_i, and A is the image sensor field of view, FOV, in the image plane IP_i. In one or more example blood analysers, D may be the distance between the windows of the container (such as distance between the windows of a cuvette). A may be defined as $A = A\_im/M^2$, where A is the area of the captured image, M is the magnification of the microscope, and A_im is the area that the camera image sensor may capture. To determine a first blood parameter BP_1 may comprise to determine a cell concentration, also denoted c, of the cell of interest. The concentration of cells in the prepared blood sample may be defined as $c = C\_i/V$ To determine a first blood parameter may comprise to determine a cell concentration c, where the cell concentration c may be compensated for dilution by one or more solutions/chemicals, such as reagents, and/or a fluid transport system. To determine a first blood parameter BP_1 may comprise to classify each cell region of the set of cell regions SCR_i based on the first cell parameter CP_k_1, such as based on the first distal cell parameter and/or the first proximal cell parameter. To determine a first blood parameter BP_1 may comprise to determine a deficiency in the prepared blood sample, such as a cell anomaly. In one or more example blood analysers, a quality control may be performed by analysing a test sample comprising a plurality of cell sized beads, such as platelet sized plastic beads and/or WBC sized plastic beads, using the blood analyser according to the disclosure. This may allow to have a quality control of the blood parameter BP_i.

In one or more example blood analysers, to determine a first blood parameter BP_1 may comprise to compensate for larger cells than the cell of interest, such as compensate in the count of number of cell regions C_1 in the first set of cell region SCR_1. For example, when the cell of interest is a platelet, it may not be possible to identify/detect platelets in a region with a high concentration of WBC, since WBC are much larger than platelets, e.g. 5-10 times larger. It may therefore be advantageous to compensate for the areas/volumes in the image I_i where large objects, such as WBC, are present. For example, a total area A_large of where the large objects are in the image I_i may be determined and compared to the total area of the image A_im. A fraction F=A_large/A_im may be determined. The compensated number of cell regions C_comp_1 may then be C_comp_1=C_1/(1−F).

In one or more example blood analysers, a distal distance also denoted DD_i between the image plane IP_i and the distal image plane DIP_i, and a proximal distance also denoted PD_i between the image plane IP_i and the proximal image plane PIP_i are equal, such as equidistant planes. For example, a first distal distance also denoted DD_1 between the first image plane IP_1 and the first distal image plane DIP_1, and a first proximal distance also denoted PD_1 between the first image plane IP_1 and the first proximal image plane PIP_1 are equal. The distance between two image planes, such as the distal distance DD_i and/or the proximal distance PD_i may for example be 5.04 μm, e.g. when the cell of interest is a platelet, e.g. since platelets have a diameter in the range of 1 μm to 5 μm. The distance between two image planes may hence be defined based on the size/diameter of the cell of interest. For example, the distance between two image planes may hence be defined as the maximum diameter and/or extension in one direction of the cell of interest. The distance between two image planes may also, for example, vary depending on the numerical aperture, NA, and therefore also the depth of field, DoF, of the microscope which is used.

In one or more example blood analysers, a distal distance also denoted DD_i between the image plane IP_i and the distal image plane DIP_i, and a proximal distance also denoted PD_i between the image plane IP_i and the proximal image plane PIP_i are in the range from 2.5 μm to 75 μm. For example, a first distal distance also denoted DD_1 between the first image plane IP_1 and the first distal image plane DIP_1, and a first proximal distance also denoted PD_1 between the first image plane IP_1 and the first proximal image plane PIP_1 are in the range from 2.5 μm to 75 μm. For example, when determining a first cell parameter CP_k_i for a WBC, the first distal image plane DIP_1 may be located in the range from five image planes to ten image planes away from the first image plane IP_1, such as in the range from eight to ten image planes. The reason for that is that optical phenomena for WBC may be observed in image planes located in the range from five to ten image planes away from the first image plane. The distance between each image plane may for example be 5 μm and a distal distance DD_i between the image plane IP_i and the distal image plane DIP_i may therefore be in the range 25 μm to 50 μm.

In one or more example blood analysers, the determination of the distal set of distal cell regions DSCR_i comprises to determine that the set of cell regions SCR_i do not belong to the distal image plane DIP_i. The determination of the first distal set of distal cell regions DSCR_1 comprises to determine that the first set of cell regions SCR_1 do not belong to the first distal image plane DIP_1. In other words, the determination of the distal set of distal cell regions DSCR_i comprises to determine that the distal image plane DIP_i is located past or away from the set of cell regions SCR_i. Optical phenomena may be observed in image planes which the set of cell regions do not belong to.

In one or more example blood analysers, the determination of the proximal set of proximal cell regions PSCR comprises to determine that the set of cell regions SCR_i do not belong to the proximal image plane PIP_i. The determination of the first proximal set of proximal cell regions PSCR_1 comprises to determine that the first set of cell regions SCR_1 do not belong to the first proximal image plane PIP_1. In other words, the determination of the proximal set of proximal cell regions PSCR_i comprises to determine that the proximal image plane PIP_i is located past or away from the set of cell regions SCR_i. Optical phenomena may be observed in image planes which the set of cell regions do not belong to.

In one or more example blood analysers, the characterization of the image I_i, such as the first image I_1, comprises to determine an initial candidate set of candidate cell regions, also denoted ICCR_i, where i is the number of the selected image, in the image I_i. In one or more example blood analysers, the initial candidate set of candidate cell regions ICCR_1 may be used as or constitute the first set of cell regions belonging to the first image plane.

To determine an initial candidate set of candidate cell regions ICCR_i in the image I_i may comprise to determine a first initial candidate set of candidate cell regions ICCR_1 in the first image I_1. The first initial candidate set of candidate cell regions ICCR_1 may comprise one or more candidate cell regions, e.g. one or more group of pixels in the first image I_1 being candidates to represent one or more cells, one or more parts of one or more cells, or optical phenomena relating to one or more cells. A candidate cell region, also denoted CCR_f, f=1, 2, . . . F, where F is the number of candidate cell regions in the initial candidate set of candidate cell regions ICCR_i, may be understood as a group of pixels in the image I_i representing a candidate cell, a part of a candidate cell, or an optical phenomena relating to a candidate cell.

In one or more example blood analysers, to determine the initial candidate set of candidate cell regions ICCR_i comprises to determine a background image, also denoted BG_i, where i is the number of the selected image, of the image I_i, and wherein the initial candidate set of candidate cell regions ICCR_i is based on the background image BG_i. To determine a background image BG_i of the image I_i may comprise to determine a first background image BG_1 of the first image I_1, and wherein the first initial candidate set of candidate cell regions ICCR_1 is based on the first background image BG_1. To determine the background image BG_i may comprise to determine a moving average window of the image I_i, e.g. to create a uniform image that follows image variations because of the illumination. The background image BG_i may also be denoted as a background intensity image. Prior to the determination of the background image BG_i, the blood analyser may be configured to determine/convert the image I_i, such as the first image I_1, to a greyscale image, e.g. from an RGB image format of the image I_i.

In one or more example blood analysers, to determine the initial candidate set of candidate cell regions comprises to determine a contrast image, also denoted CI_i, where i is the number of the selected image, based on the background image BG_i and the image I_i. To determine a contrast image CI_i based on the background image BG_i and the image I_i may comprise to determine a first contrast image CI_1 based on the first background image BG_1 and the first image I_1. In one or more example blood analysers, the initial candidate set of candidate cell regions ICCR_i is based on the contrast image CI_i. The first initial candidate set of candidate cell regions ICCR_1 may be based on the first contrast image CI_1. To determine the contrast image CI_i may comprise to subtract the image I_i from the background image BG_i, e.g. subtracting pixel by pixel the image I_i from the background image BG_i. In one or more example blood analysers, to determine the contrast image CI_i may comprise to subtract the background image BG_i from the image I_i, e.g. subtracting pixel by pixel the background image BG_i from the image I_i.

In one or more example blood analysers, to determine the initial candidate set of candidate cell regions ICCR_i comprises to determine a binary image also denoted BI_i, where i is the number of the selected image, based on the contrast image CI_i, and wherein the initial candidate set of candidate cell regions ICCR_i is based on the binary image BI_i. To determine a binary image BI_i based on the contrast image CI_i may comprise to determine a first binary image BI_1 based on the first contrast image CI_1, and wherein the first initial candidate set of candidate cell regions ICCR_1 is based on the first binary image BI_1. To determine a binary image BI_i based on the contrast image CI_i may comprise to apply a contrast criterion, such as thresholding the contrast image CI_i, e.g. the first contrast image CI_1, to generate the binary image BI_i, e.g. the first binary image BI_1. For example, to determine a binary image BI_i based on the contrast image CI_i may comprise to apply a binary mask threshold, e.g. for each pixel in the contrast image CI_i. The binary mask threshold may vary depending on the prepared blood sample, such as the sample type. For example, the binary mask threshold may be 0.09 (e.g. with 23 counts) for a potassium ethylenediaminetetraacetic acid, EDTA, sample, and 0.075 (e.g. with 19 counts) for an iloprost added to heparin, IH, sample. For example, the binary image BI_i may comprise mostly dark areas and the remaining being candidate cell regions as brighter areas, or vice-versa.

In one or more example blood analysers, to determine the initial candidate set of candidate cell regions ICCR_i comprises to identify connected regions, also denoted COR_i, where i is the number of the selected image, in the binary image BI_i. To identify connected regions COR_i in the binary image BI_i may comprise to identify first connected regions COR_1 in the first binary image BI_1. In one or more example blood analysers, the initial candidate set of candidate cell regions ICCR_i is based on the connected regions COR_i in the binary image BI_i. The first initial candidate set of candidate cell regions ICCR_1 may be based on the first connected regions COR_1 in the first binary image BI_1. To identify connected regions COR_i may comprise to identify connected pixels, such as connected 1's or 0's in the binary image BI_i. The initial candidate set of candidate cell regions ICCR_i may comprise a list of regions identified to be connected in the binary image BI_i. To identify connected regions COR_i in the binary image BI_i may comprise to identify connected components, such as clusters of pixels or regions of pixels.

In one or more example blood analysers, to determine the initial candidate set of candidate cell regions ICCR_i comprises to determine whether each respective connected region of the connected regions COR_i satisfies an area criterion, also denoted AC_m, m=1, 2, ... M, where M is the number of the connected regions COR_i in the initial candidate set of candidate cell regions ICCR_i. In one or more example blood analysers, the blood analyser is configured to in accordance with the determination that the respective connected region of the connected regions COR_i satisfies the area criterion AC_i, to include the respective connected region satisfying the area criterion AC_i as a candidate cell region CCR_f in the initial candidate set of candidate cell regions ICCR_i. To determine the first initial candidate set of candidate cell regions ICCR_1 may comprise to determine whether each respective first connected region of the connected regions COR_1 satisfies an area criterion AC_m, and in accordance with the determination that the respective first connected region satisfies the area criterion AC_m, to include the respective first connected region satisfying the area criterion AC_m as a candidate cell region CCR_f in the first initial candidate set of candidate cell regions ICCR_1. The area criterion AC_m may comprise an area range criterion within certain limits depending on the type of cell of interest, e.g. to classify each candidate cell region CCR_f. For example, the area criterion AC_m may be used/applied to remove/sort away one or more of noise, small regions e.g. representing small particles that cannot be cells, cell regions representing cells that are not cells of interest, e.g. cell regions representing cells bigger and/or smaller than the cells of interest. For example, when the cell of interest is platelets, the regions potentially representing WBCs and RBC may be sorted away and not identified as candidate cell regions. When it is not determined that the respective first connected region of the connected regions COR_1 satisfies the area criterion AC_m, the respective first connected region of the connected regions COR_1 may be discarded, e.g. sorted away and not included in the first initial candidate set of candidate cell regions ICCR_1.

In one or more example blood analysers, the area criterion AC_m comprises a threshold cell region area in the range from 1 $\mu m^2$ to 100 $\mu m^2$. For example, when the cell type of interest is platelets, the area criterion AC_m may discard the connected regions COR_i corresponding to a circle having a diameter of less or equal to 1.5 $\mu m$ and/or larger than 4.5 $\mu m$. In other words, the area criterion AC_m may comprise a threshold for the largest extraction in one direction of the connected region COR_i and/or a smallest extraction in one direction of the connected region COR_i. The area criterion AC_m may comprise a threshold of pixel region range, such as threshold for clusters of pixels. For example, when the cell type of interest is white blood cells or a specific type of white blood cells, the area criterion AC_m may discard the connected regions COR_i corresponding to a circle having a diameter of less or equal to a lower WBC threshold, such as 5 $\mu m$ and/or larger than an upper WBC threshold, such as 20 $\mu m$. For example, when the cell type of interest is a specific type of white blood cells, such as Neutrophil, Eosinophil, Basophil, or Monocyte, the area criterion AC_m may discard the connected regions COR_i corresponding to a circle having a diameter of less or equal to a lower WBC threshold, such as 10 $\mu m$ and/or larger than an upper WBC threshold, such as 18 $\mu m$ or 20 $\mu m$.

In one or more example blood analysers, the characterization of the image I_i comprises to determine whether each of the respective candidate cell regions CCR_f of the initial candidate set of candidate cell regions ICCR_i satisfies a first criterion, also denoted FC_j j=1, 2, . . . J, where J is the number of the candidate cell regions CCR_f in the initial candidate set of candidate cell regions ICCR_i. In one or more example blood analysers, the blood analyser is configured to in accordance with the determination that a respective candidate cell region CCR_f of the initial candidate set of candidate cell regions ICCR_i respectively satisfies the first criterion FC_j, to include the respective candidate cell region CCR_f in a first candidate set of cell regions, also denoted FCCR_i, where i is the number of the selected image I_i. In one or more example blood analysers, the set of cell regions SCR_i is based on the first candidate set of cell regions FCCR_i.

In one or more example blood analysers, the first candidate set of cell regions FCCR_1 may be used as or constitute the first set of cell regions belonging to the first image plane.

In one or more example blood analysers, the characterization of the first image I_1 comprises to determine whether each of the respective candidate cell regions, also denoted CCR_f, of the first initial candidate set of candidate cell regions ICCR_1 satisfies a first criterion FC_j, and in accordance with the determination that a respective candidate cell region CCR_f of the first initial candidate set of candidate cell regions ICCR_1 respectively satisfies the first criterion FC_j, to include the respective candidate cell region CCR_f in a first candidate set of cell regions FCCR_1, and wherein the first set of cell regions SCR_1 is based on the first candidate set of cell regions FCCR_1. In one or more example blood analysers, the first criterion FC_j comprises a contrast criterion that each of the respective candidate cell regions CCR_f of the first initial candidate set of candidate cell regions ICCR_1 have to satisfy to be included in the first candidate set of cell regions FCCR_1. The first criterion FC_j may comprise an intensity contrast criterion, such as a cell region intensity contrast. For example, the first criterion FC_j for a cell region may be satisfied if a contrast parameter of the cell region in the image is larger than a distal contrast parameter of the same cell region in the distal image and larger than a proximal contrast parameter of the same cell region in the proximal image. In one or more example blood analysers, for example when the cells of interest are WBC, the first criterion FC_j may comprise using a Sobel operator. The Sobel operator may be the spatial intensity gradient of the contrast image CI_i. Using the Sobel operator may comprise determining the first spatial contrast derivative in the 2D x and y directions. In other words, the first spatial contrast derivative may be a contrast change between two neighbouring pixels in the x or y direction. Using the Sobel operator may comprise determining a gradient magnitude. For example, determining that a respective candidate cell regions CCR_f of the first initial candidate set of candidate cell regions ICCR_1 satisfies the first criterion FC_j may comprise that the gradient magnitude has the largest value in the cell region in the first image compared to the distal cell region and/or the proximal cell region. In other words, the cell, such as WBC, is in focus in the first image plane when the spatial contrast variations peaks in the first image plane.

When it is not determined that each of the respective candidate cell regions CCR_f satisfies the first criterion FC_j, the respective candidate cell region CCR_f may be discarded, e.g. sorted away and not included in the first candidate set of cell regions FCCR_i.

In one or more example blood analysers, the first criterion FC_j is based on a distal contrast parameter, also denoted DCP_i, of the distal image DI_i and a proximal contrast parameter PCP_i of the proximal image PI_1. For example, the first criterion FC_j may be based on a first distal contrast parameter DCP_p_1 of the first distal image DI_1 and a first proximal contrast parameter PCP_p_1 of the first proximal image PI_1.

In one or more example blood analysers, to determine whether each of the respective candidate cell regions CCR_f of the first candidate set of cell regions FCCR_i satisfies a first criterion FC_j comprises to determine whether a contrast parameter, also denoted CP_i, of the contrast image CI_i is larger than the distal contrast parameter DCP_i, such as a distal contrast image DCI_i, and larger than the proximal contrast parameter PCP_i, such as a proximal contrast image DCI_i. For example, to determine whether each of the respective candidate cell regions CCR_f of the first candidate set of cell regions FCCR_i satisfies a first criterion FC_j comprises to determine whether a first contrast parameter CP_k_1 of the first contrast image CI_1 is larger than the first distal contrast parameter DCP_p_1 and larger than the first proximal contrast parameter PCP_p_1.

In one or more example blood analysers, when it is determined that the contrast parameter CP_i of the contrast image CI_i is larger than the distal contrast parameter DCP_i and larger than the proximal contrast parameter PCP_i, the blood analyser is configured to include the respective candidate cell region CCR_f in the first candidate set of cell regions FCCR_i.

The distal contrast parameter DCP_i may comprise a contrast parameter, such as contrast intensity or value, of the respective candidate cell region CCR_f in the distal image plane DIP_i, such as in the first distal image plane DIP_1. In other words, the distal contrast parameter DCP_i may comprise a contrast parameter of the respective candidate cell region CCR_f as seen from or in the distal image plane DIP_i. In other words, the distal contrast parameter DCP_i may comprise a distal contrast image also denoted DCI_i for the corresponding respective candidate cell regions CCR_f.

The proximal contrast parameter PCP_i may comprise a contrast parameter, such as contrast intensity or value, of the respective candidate cell region CCR_f in the proximal image plane PIP_i, such as in the first proximal image plane PIP_1. In other words, the proximal contrast parameter PCP_i may comprise a contrast parameter of the respective candidate cell region CCR_f as seen from or in the proximal image plane PIP_i. In other words, the proximal contrast parameter PCP_i may comprise a proximal contrast image also denoted PCI_i for the corresponding respective candidate cell regions CCR_f.

The contrast parameter CP_i may comprise a contrast parameter, such as contrast intensity or value, of the respective candidate cell region CCR_f in the image plane IP_i, such as in the first image plane IP_1. In other words, the contrast parameter CP_i may comprise a contrast parameter of the respective candidate cell region CCR_f as seen from or in the image plane IP_i. In other words, the contrast parameter CP_i may comprise or be comprised in the contrast image CI_i for the corresponding respective candidate cell regions CCR_f.

To determine whether the contrast parameter CP_i, of the contrast image CI_i is larger than the distal contrast parameter DCP_i and larger than the proximal contrast parameter PCP_i may comprise to determine whether the intensity contrast of the respective candidate cell region CCR_f in the image plane IP_i, such as in the contrast image CI_i, is larger than the intensity contrast of the respective candidate cell region CCR_f in the distal image plane DIP_i, such as in the distal contrast image DCI_i, and larger than the intensity contrast of the respective candidate cell region CCR_f in the proximal image plane PIP_i, such as in the proximal contrast image PCI_i.

In other words, when it is determined that the contrast parameter CP_i of the contrast image CI_i is larger than the distal contrast parameter DCP_i and larger than the proximal contrast parameter PCP_i, it may be an indication that the respective candidate cell region CCR_f belongs to the image plane IP_i and not to the distal image plane DIP_i or the proximal image plane PIP_i. Further, when it is determined that the contrast parameter CP_i of the contrast image CI_i is larger than the distal contrast parameter DCP_i and larger than the proximal contrast parameter PCP_i, it may be an indication that the respective candidate cell region CCR_f are more in focus in the image plane IP_i than in the distal image plane DIP_i and more in focus than in the proximal image plane PIP_i.

In one or more example blood analysers, the characterization of the image I_i comprises to determine whether each of the respective candidate cell regions, also denoted CCR_fi, fi=1, 2, . . . FI, where FI is the number of candidate cell regions in the first candidate set of candidate cell regions FCCR_i, of the first candidate set of candidate cell regions FCCR_i satisfies a second criterion, also denoted SC_n n=1, 2, . . . N, where N is the number of the candidate cell regions CCR_fi in the first candidate set of candidate cell regions FCCR_i.

In one or more example blood analysers, the blood analyser is configured to in accordance with the determination that a respective candidate cell region CCR_fi of the first candidate set of candidate cell regions FCCR_i respectively satisfies the second criterion SC_n, to include the respective candidate cell region CCR_fi in a second candidate set of cell regions, also denoted SCCR_i, where i is the number of the selected image I_i. In one or more example blood analysers, the set of cell regions SCR_i is based on the second candidate set of cell regions SCCR_i. In one or more example blood analysers, the second candidate set of cell regions SCCR_1 may be used as or constitute the first set of cell regions belonging to the first image plane.

In one or more example blood analysers, the characterization of the first image I_1 comprises to determine whether each of the respective candidate cell regions CCR_fi of the first candidate set of candidate cell regions FCCR_1 satisfies a second criterion SC_n, and in accordance with the determination that a respective candidate cell region CCR_fi of the first candidate set of candidate cell regions FCCR_1 respectively satisfies the second criterion SC_n, to include the respective candidate cell region CCR_fi in a second candidate set of cell regions SCCR_1, and wherein the first set of cell regions SCR_1 is based on the second candidate set of cell regions SCCR_1. In one or more example blood analysers, the second criterion SC_n comprises a contrast threshold criterion that each of the respective candidate cell regions CCR_fi of the first candidate set of candidate cell regions FCCR_1 have to satisfy to be included in the second candidate set of cell regions SCCR_i. The second criterion SC_n may comprise an intensity contrast threshold criterion, such as a cell region intensity contrast threshold. The second criterion SC_n may comprise that the respective candidate cell regions CCR_fi of the first candidate set of candidate cell regions FCCR_1 have to satisfy that the intensity contrast has to be equal or above 35% (of the maximum intensity contrast) of the 90% fractile (such as percentile) of the respective candidate cell regions CCR_f of the first candidate set of candidate cell regions FCCR_1. Applying the second criterion SC_n may act as a filter rule to discard or suppress false positives in the first candidate set of cell regions FCCR_i. When it is not determined that each of the respective candidate cell regions CCR_fi satisfies the second criterion SC_n, the respective candidate cell region CCR_fi may be discarded, e.g. sorted away and not included in the second candidate set of cell regions SCCR_i.

In one or more example blood analysers, the cell regions CR_k are indicative of, such as representing, one or more platelets, e.g. in the prepared blood sample. In one or more example blood analysers, the cell regions CR_k are indicative of, such as representing, white blood cells or one or more specific types of white blood cells, e.g. in the prepared blood sample.

In one or more example blood analysers, the blood analyser is configured to select a second image I_2 associated with a second image plane IP_2 of the prepared blood sample from the image data ID. The description of the selection of the first image I_1 may also apply to the selection of the second image I_2.

In one or more example blood analysers, the blood analyser is configured to characterize the second image I_2, wherein the characterization of the second image I_2 comprises to determine a second set of cell regions SCR_2 belonging to the second image plane IP_2. The description of the characterization of the first image I_1 may also apply to the characterization of the second image I_2, and the description of determination of the first set of cell regions SCR_1 belonging to the first image plane IP_1 may also apply to the determination of the second set of cell regions SCR_2 belonging to the second image plane IP_2.

In one or more example blood analysers, to determine a first blood parameter BP_1 is based on the second set of cell regions SCR_2. The description of determination of the first blood parameter BP_1 based on the first set of cell regions SCR_1 may also apply to the determination of the determination of the first blood parameter BP_1 based on the second set of cell regions SCR_2. To determine the first blood parameter BP_1 based on the second set of cell regions SCR_2 may comprise to determine the first blood parameter BP_1 based on the first set of cell regions SCR_1 and the second set of cell regions SCR_2.

In one or more example blood analysers, to determine a first blood parameter BP_1 based on the first set of cell regions SCR_1 and the second set of cell regions SCR_2 comprises to determine a first number of cell regions, also denoted C_1 in the first set of cell regions SCR_1 and a second number of cell regions C_2 in the second set of cell regions SCR_2, and wherein the first blood parameter BP_1 is based on the first number C_1 and the second number C_2. In one or more example blood analysers, to determine a first blood parameter BP_1 may be based on a third set of cell regions SCR_3 belonging to a third image plane IP_3 in a third image I_3, a fourth set of cell regions SCR_4 belonging to a fourth image plane IP_4 in a fourth image I_4, and/or a fifth set of cell regions SCR_5 belonging to a fifth image plane IP_5 in a fifth image I_5.

The first blood parameter may therefore be based on a third number C_3, a fourth number C_4, and/or a fifth number C_5.

When the first blood parameter BP_1 is based on more than one set of cell regions SCR_i, such as two, three, four, or five set of cell regions SCR_i, to determine the first blood parameter BP_1 may comprise to apply a third criterion, also denoted TC, to the two or more set of cell regions SCR_i.

The third criterion TC may comprise an outlier criterion, such as a Dixon criterion. Applying the third criterion TC may comprise to determine one or more outliers, such as a single outlier (Dixon test), and discard or suppress the one or more outlier when determining the first blood parameter.

It is to be understood that a description of a feature in relation to method(s) is also applicable to the corresponding feature in blood analyser and/or system and vice-versa.

FIG. 1 schematically illustrates an example system 2, comprising a microscope 20, an image acquiring device (not shown, e.g. implemented/integrated with the microscope), a prepared blood sample in a container 22 (e.g. cuvette, cavity), and a blood analyser 10. The blood analyser 10 is a blood analyser according to the disclosure. The blood analyser 10 comprises a memory 10A, an interface 10B, and one or more processors, such as a processor 10C. The blood analyser 10 is configured to obtain 6 image data ID of a prepared blood sample, such as via the interface 10B from the image acquiring device. Optionally, the blood analyser 10 may be configured to obtain the image data from a network such as a global network, e.g. the internet or a telecommunications network. For example, the blood analyser 10 may be configured to obtain the image data from a server device (not shown), via the network. The prepared blood sample may be placed/positioned in a container 22, such as a cuvette, while the image data ID, e.g. the plurality of images of the prepared blood sample, is obtained/acquired, such as the first image I_1. The height that the image planes are associated with may be a height, e.g. on the z-axis, with respect to the bottom of the container 22 when the image was obtained/captured. The first image plane IP_1 may be associated with a first height H_1 in the prepared blood sample. The image planes that the plurality of images may extend in a two dimensional plane, e.g. a x-y-plane with respect to the z-axis. The image data ID may therefore comprise a plurality of images being associated with images planes, where each image plane is separated by a distance Δz to the next obtained/acquired image plane and/or the previous obtained/acquired image plane. Δz may be the stepping incrementation for each obtained/acquired image. In the example of FIG. 1, sixteen image planes are represented including the first image plane IP_1, the first distal image plane DIP_1, and the first proximal image pane PIP_1. The number of images and image planes may be increased to comprise for example at least thirty, at least forty, or at least a hundred. The image data ID may comprise a plurality of images of the prepared blood sample, where each image may be associated with an image plane being equidistant from the next obtained/acquired image plane and/or the previous obtained/acquired image plane. In other words, the image data ID may comprise a 3D image stack, such as a stack of images where each image of the image stack is associated with an image plane having a different associated height along the z-axis of the prepared blood sample. The image data ID may comprise a plurality of images of a central portion 24 of the blood sample. In other words, the image data ID may comprise a plurality of obtained/acquired images of the prepared blood sample representing areas or volumes of the prepared blood sample being located away from the edges of the container 22 in which the prepared blood sample is contained. Alternatively or additionally, the image data ID may comprise a plurality of obtained/acquired images of the prepared blood sample representing areas or volumes of the whole container 22, such as the full width and/or height of the container 22, e.g. including the windows of the container 22. The blood sample may comprise a plurality of cells, such as a first cell CE_1. For illustrative purposes the container 22 and the cells have been enlarged and are therefore not to scale. In the example shown in FIG. 1, the cell CE_1 represent a white blood cell, WBC. The smaller cells, such as cell CE_10, may for example be platelets.

Each image of the image data ID may comprise a plurality of representations. The plurality of representations may comprise a plurality of particles, such as cells, e.g. white blood cells, WBCs, platelets, red blood cells, RBCs, and/or external particles, e.g. dust or residues from the container or the like.

The blood analyser 10 is configured to select a first image I_1, such as using the processor 10C, associated with a first image plane IP_1 of the prepared blood sample from the image data ID.

The blood analyser 10 is configured to characterize the first image I_1, wherein the characterization of the first image I_1 comprises to determine a first set of cell regions SCR_1 belonging to the first image plane IP_1. The first set of cell regions SCR_1 may be representative of the cell CE_1.

The blood analyser 10 is configured to select, from the image data ID, a first distal image DI_1 associated with a first distal image plane DIP_1 on a distal side of the first image plane IP_1, and determine a first distal set of distal cell regions DSCR_1 associated with the first set of cell regions SCR_1 and/or to select, from the image data ID, a first proximal image PI_1 associated with a first proximal image plane PIP_1 on a proximal side of the first image plane IP_1, and determine a first proximal set of proximal cell regions PSCR_1 associated with the first set of cell regions SCR_1.

The blood analyser 10 is configured to determine a first cell parameter CP_k_1 for each cell region CR_k_i of the first set of cell regions SCR_1 based on the first distal set of distal cell regions DSCR_1 and/or based on the first proximal set of proximal cell regions PSCR_1.

In one or more example systems and/or blood analysers, the blood analyser is configured to select a primary intermediate distal image IDI_1 associated with a primary intermediate distal image plane IDIP_1 on a distal side of the first image plane IP_1, and to determine a primary intermediate distal set of distal cell regions IDSCR_1 associated with the first set of cell regions SCR_1, and wherein the first cell parameter CP_k_1 for each cell region CR_k_i of the first set of cell regions SCR_1 is based on the primary intermediate distal set of distal cell regions IDSCR_1. In one or more example systems and/or blood analysers, the blood analyser is configured to select a secondary intermediate distal image IDI_2 associated with a secondary intermediate distal image plane IDIP_2 on a distal side of the first image plane IP_1 and the primary intermediate distal image plane IDIP_1, and to determine a secondary intermediate distal set of distal cell regions IDSCR_2 associated with the first set of cell regions SCR_1, and wherein the first cell parameter CP_k_1 for each cell region CR_k_i of the first set of cell regions SCR_1 is based on the primary intermediate distal set of distal cell regions IDSCR_1 and/or the secondary intermediate distal set of distal cell regions IDSCR_2. As may be seen in FIG. 1, the secondary intermediate distal image plane IDIP_2 is not the direct neighbouring image plane to the primary intermediate distal image plane IDIP_1. The blood analyser may be configured to skip one or more image planes when selecting an intermediate distal image plane IDIP_i.

In one or more example system and/or blood analysers, the blood analyser is configured to select a primary intermediate proximal image IPI_1 associated with a primary intermediate proximal image plane IPIP_1 on a proximal side of the first image plane IP_1, and to determine a primary intermediate proximal set of proximal cell regions IPSCR_1 associated with the first set of cell regions SCR_1, and wherein the first cell parameter CP_k_i for each cell region CR_k_i of the first set of cell regions SCR_1 is based on the primary intermediate proximal set of proximal cell regions IPSCR_1. The blood analyser is configured to select a secondary intermediate proximal image IPI_2 associated with a secondary intermediate proximal image plane IPIP_2 on a proximal side of the first image plane IP_1 and the primary intermediate proximal image plane IPIP_1.

In one or more example systems and/or blood analysers, the first distal image plane DIP_1 is associated with a first distal height DH_1 in the prepared blood sample, the first distal height DH_1 being different from the first height H_1.

In one or more example systems and/or blood analysers, the first proximal image plane PIP_1 is associated with a first proximal height PH_1 in the prepared blood sample, the first proximal height PH_1 being different from the first height H_1.

In FIG. 1, the selected first distal image DI_1 is associated with a first distal image plane DIP_1 located seven planes away from the first image plane IP_1 on a distal side of the first image plane IP_1. In other words, there is six image planes, such as six intermediate distal image planes IDIP_i, between the first image plane IP_1 and the first distal image plane DIP_1. In FIG. 1, the selected first proximal image PI_1 is associated with a first proximal image plane PIP_1 located five planes away from the first image plane IP_1 on a proximal side of the first image plane IP_1. In other words, there is four image planes, such as four intermediate proximal image planes IPIP_i, between the first image plane IP_1 and the first proximal image plane PIP_1.

A first distal distance also denoted DD_1 between the first image plane IP_1 and the first distal image plane DIP_1, and a first proximal distance also denoted PD_1 between the first image plane IP_1 and the first proximal image plane PIP_1 are in the range from 2.5 μm to 75 μm. In FIG. 1, the first distal distance DD_1 is larger than the first proximal distance PD_1.

Figure 2A:
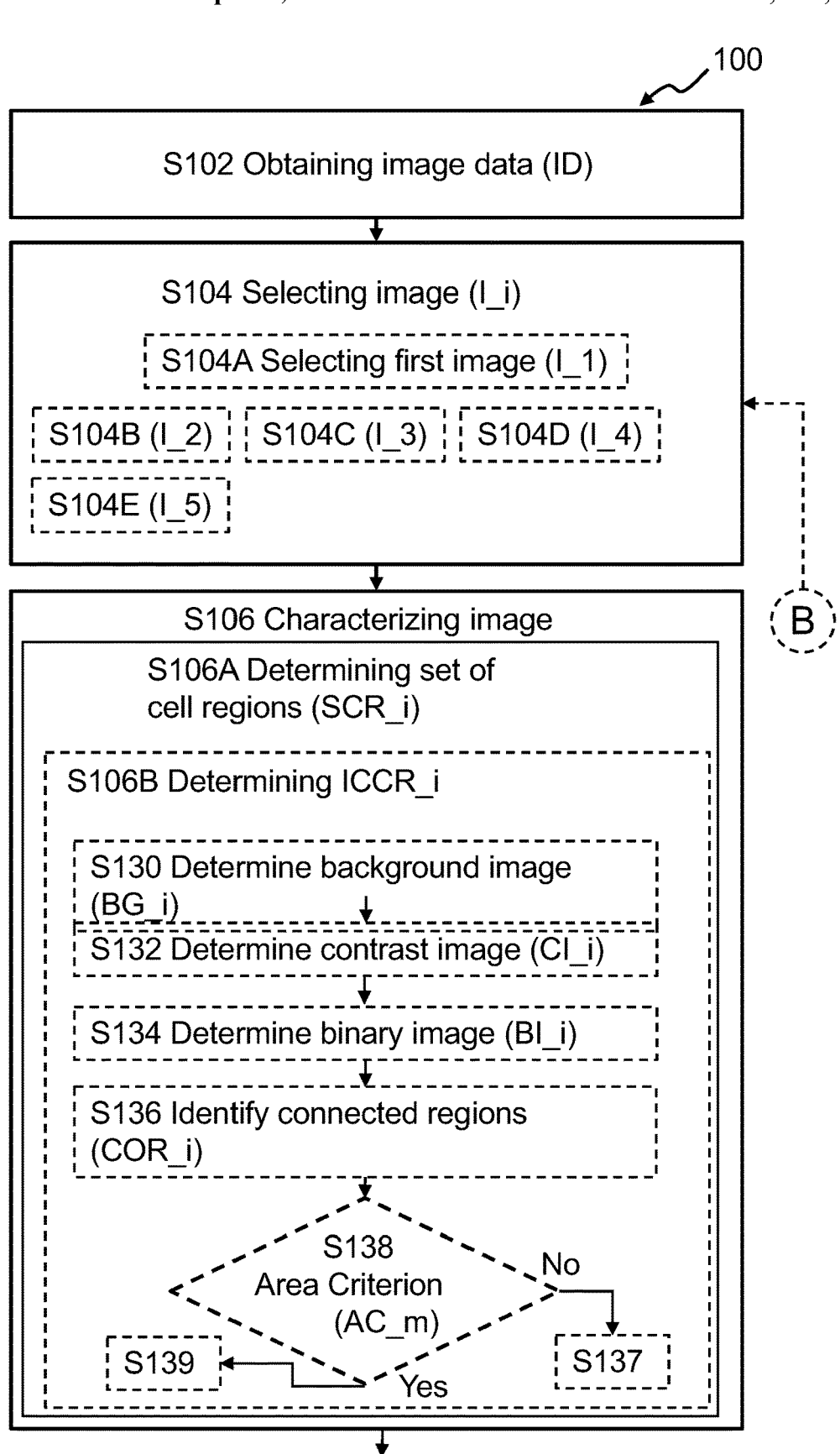
FIGS. 2A-C are flow diagrams of an example method according to the present disclosure.
Figure 2B:
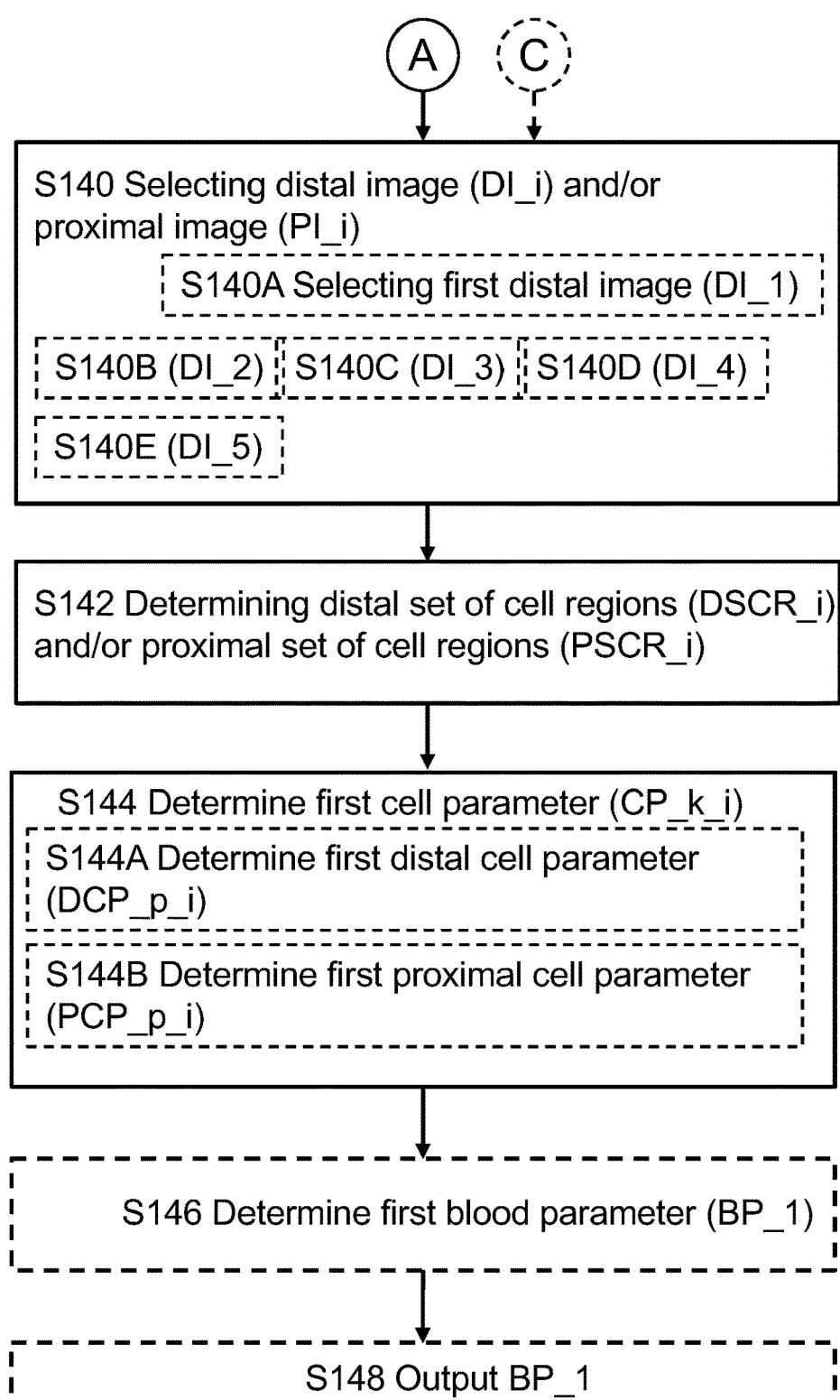
Figure 2C:
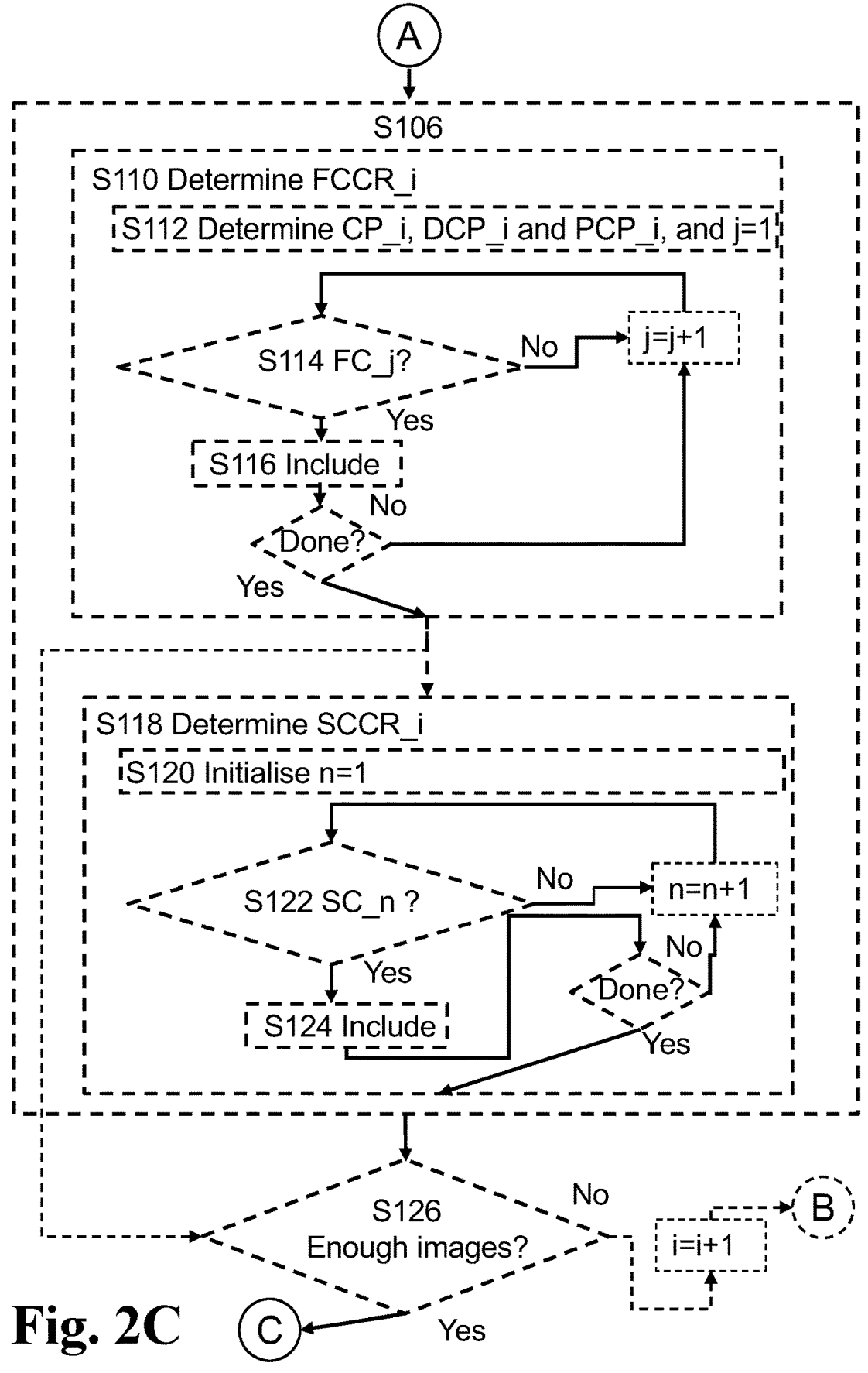

The blood analyser 10 may be configured to perform any of the methods disclosed in FIGS. 2A, 2B, 2C.

The blood analyser 10, such as the processor 10C, is optionally configured to perform any of the operations disclosed in FIGS. 2A-2C (such as any one or more of S104A, S104B, S104C, S104D, S104E, S106B, S130, S132, S134, S136, S137, S138, S110, S112, S114, S116, S118, S120, S122, S124, S126, S140A, S140B, S140C, S140D, S140E, S144A, S144B, S146, S148). The operations of the blood analyser may be embodied in the form of executable logic routines (for example, lines of code, software programs, etc.) that are stored on a non-transitory computer readable medium (for example, memory 10A) and are executed by the processor 10C.

Furthermore, the operations of the blood analyser 10 may be considered a method that the blood analyser 10 is configured to carry out. Also, while the described functions and operations may be implemented in software, such functionality may as well be carried out via dedicated hardware or firmware, or some combination of hardware, firmware and/or software.

FIGS. 2A, 2B, 2C show a flow diagram of an example method. A method 100 of analysing a blood sample, such as a prepared blood sample, is illustrated, the method 100 comprising obtaining S102 image data, also denoted ID, of a prepared blood sample. The method 100 comprises selecting S104 an image, also denoted I_i, associated with an image plane, also denoted IP_i, of the prepared blood sample from the image data ID. The method 100 may comprise selecting S104A a first image, also denoted I_1, associated with a first image plane IP_1 of the prepared blood sample from the image data ID. In other words, selecting S104 an image I_i may comprise selecting S104A a first image I_1 associated with a first image plane IP_1 of the prepared blood sample from the image data ID. The first image I_1 may be selected from a plurality of images obtained from the image data ID. Optionally, the method 100 comprises selecting S104B a second image I_2, selecting S104C a third image I_3, selecting S104D a fourth image I_4, and/or selecting S104E a fifth image I_5.

The method 100 comprises characterizing S106 the image I_i. In one or more example methods, characterizing S106 the image I_i, such as the first image I_1, comprises determining a set of cell regions SCR_i, such as the first set of cell regions SCR_1, belonging to the image plane IP_i, such as the first image plane IP_1.

In one or more example methods, determining S106A a set of cell regions SCR_i comprises determining S106B an initial candidate set of candidate cell regions ICCR_i in the image I_i.

The step of determining S106B an initial candidate set of candidate cell regions ICCR_i in the image I_i shows an example of determining a set of cell regions SCR_i.

In one or more example methods, determining S106B the initial candidate set of candidate cell regions ICCR_i comprises determining S130 a background image BG_i of the image I_i, and wherein the initial candidate set of candidate cell regions ICCR_i is based on the background image BG_i.

In one or more example methods, determining S106B the initial candidate set of candidate cell regions ICCR_i comprises determining S132 a contrast image CI_i based on the background image BG_i and the image I_i, and wherein the initial candidate set of candidate cell regions ICCR_i is based on the contrast image CI_i.

In one or more example methods, determining S106B the initial candidate set of candidate cell regions ICCR_i comprises determining S134 a binary image BI_i based on the contrast image CI_i, and wherein the initial candidate set of candidate cell regions ICCR_i is based on the binary image BI_i.

In one or more example methods, determining S106B the initial candidate set of candidate cell regions ICCR_i comprises identifying S136 connected regions COR_i in the binary image BI_i, and wherein the initial candidate set of candidate cell regions ICCR_i is based on the connected regions COR_i in the binary image BI_i.

In one or more example methods, determining S106B the initial candidate set of candidate cell regions ICCR_i comprises determining S138 whether each respective connected region of the connected regions COR_i satisfies an area criterion AC_m. In one or more example methods, in accordance with the determination that the respective connected region satisfies the area criterion AC_m, including S139 the respective connected region satisfying the area criterion AC_m as a candidate cell region CCR_f in the initial candidate set of candidate cell regions ICCR_i. In one or more example methods, when it is not determined that the respective connected region of the connected regions COR_i satisfies the area criterion AC_m, the method 100 comprises discarding S137 the respective connected region.

The method 100 comprises selecting S140 a distal image, also denoted DI_i, and/or a proximal image, also denoted PI_i, associated respectively with a distal image plane, also denoted DIP_i, and/or a proximal image plane, also denoted PIP_i, of the prepared blood sample from the image data ID. The method 100 may comprise selecting S140A a first distal image, also denoted DI_1, associated with a first distal image plane DIP_1 and/or a first proximal image PI_1 associated with a first proximal image plane PIP_1, of the prepared blood sample from the image data ID. The first distal image DI_1 may be selected from a plurality of images obtained from the image data ID. Optionally, the method 100 comprises selecting S140B a second distal image DI_2 and/or a second proximal image PI_2, selecting S140C a third distal image DI_3 and/or a third proximal image PI_3, selecting S140D a fourth distal image DI_4 and/or a fourth proximal image PI 4, and/or selecting S140E a fifth distal image DI_5 and/or a fifth proximal image PI_5.

In one or more example methods, the method 100 comprises determining S142 a distal set of distal cell regions, also denoted DSCR_i, where i is the number of the selected distal image, associated with the set of cell regions SCR_i and/or determining S142 a proximal set of proximal cell regions, also denoted PSCR_i, where i is the number of the selected proximal image, associated with the set of cell regions SCR_i. Determining S142 a distal set of distal cell regions DSCR_i associated with the set of cell regions SCR_i may comprise determining a first distal set of distal cell regions DSCR_1 associated with the first set of cell regions SCR_1. Determining S142 a proximal set of proximal cell regions PSCR_i associated with the set of cell regions SCR_i may comprise determining a first proximal set of proximal cell regions PSCR_1 associated with the first set of cell regions SCR_1.

The method 100 comprises determining S144 a first cell parameter, also denoted CP_k_i, where i is the number of the selected image and k is the number of the cell region, for each cell region CR_k_i of the set of cell regions SCR_i based on the distal set of distal cell regions DSCR_i and/or the proximal set of proximal cell regions PSCR_i. In one or more example blood analysers, the blood analyser is configured to determine a first cell parameter CP_k_1 for each cell region of the first set of cell regions SCR_1 based on the first distal set of distal cell regions DSCR_1 and/or the first proximal set of proximal cell regions PSCR_1.

In one or more example methods, determining S144 the first cell parameter CP_k_1 comprises determining S144A a first distal cell parameter DCP_p_i, where i is the number of the selected distal image and p is the number of the distal cell region, for each distal cell region DCR_p_i of the distal set of distal cell regions DSCR_i. Optionally, determining S144 the first cell parameter CP_k_1 is based on the first distal cell parameter DCP_p_1 for the associated first distal cell regions DCR_p_1 of the first distal image plane DIP_1.

In one or more example methods, determining S144 the first cell parameter CP_k_1 comprises determining S144B a first proximal cell parameter PCP_p_i, where i is the number of the selected proximal image and p is the number of the proximal cell region, for each proximal cell region PCR_p_i of the first proximal set of proximal cell regions PSCR_i. Optionally, determining S144 the first cell parameter CP_k_1 is based on the first proximal cell parameter PCP_p_1 for the associated proximal cell regions PCR_p_1 of the first proximal image plane PIP_1.

In one or more example methods, the method 100 comprises determining S146 a first blood parameter BP_1 of the prepared blood sample based on the first cell parameters CP_k_1.

In one or more example methods, the method 100 comprises outputting S148 the first blood parameter BP_1, e.g. to a user of the blood analyser via an interface 10B of the blood analyser and/or to a server device.

FIG. 2C shows an example of a characterization S106 of the image I_i.

In one or more example methods, characterizing S106 the image I_i comprises determining S110 a first candidate set of cell regions FCCR_i.

In one or more example methods, characterizing S106 the image I_i comprises determining S114 whether each of the respective candidate cell regions CCR_f of the initial candidate set of candidate cell regions ICCR_i satisfies a first criterion FC_j, j=1, 2, . . . J, where J is the number of the candidate cell regions CCR_f in the initial candidate set of candidate cell regions ICCR_i.

In one or more example methods, in accordance with the determination that a respective candidate cell region CCR_f of the initial candidate set of candidate cell regions ICCR_i respectively satisfies the first criterion FC_j, the method 100 comprises including S116 the respective candidate cell region in a first candidate set of cell regions FCCR_i, and wherein the set of cell regions SCR_1 is based on the first candidate set of candidate cell regions FCCR_i.

In one or more example methods, when it is not determined that each of the respective candidate cell regions CCR_f satisfies the first criterion FC_j, the method 100 comprises discarding the respective candidate cell region CCR_f and incrementing index j=j+1, and determining whether the next respective candidate cell region CCR_f of the initial candidate set of candidate cell regions ICCR_i satisfies a first criterion FC_j.

In one or more example methods, determining S110 a first candidate set of cell regions FCCR_i comprises determining S112 a contrast parameter CP_i of the image I_i, such as first contrast parameter CP_k_1 of the first image I_1. In one or more example methods, determining S110 a first candidate set of cell regions FCCR_i comprises determining S112 a distal contrast parameter DCP_i of the distal image DI_i, such as first distal contrast parameter DCP_p_1 of the first distal image I_1. In one or more example methods, determining S110 a first candidate set of cell regions FCCR_i comprises determining S112 a proximal contrast parameter PCP_i of the proximal image PI_i, such as first proximal contrast parameter PCP_p_1 of the first proximal image PI_1.

In one or more example methods, determining S110 a first candidate set of cell regions FCCR_i comprises initialising S112 index j=1 to start determining S114 whether each of the respective candidate cell regions CCR_f satisfies the first criterion FC_j.

In one or more example methods, the method 100 comprises determining whether all the respective candidate cell region CCR_f of the initial candidate set of candidate cell regions ICCR_i have been checked, "Done?". When it is not determined that all the respective candidate cell region CCR_f of the initial candidate set of candidate cell regions ICCR_i have been checked, the method 100 comprises incrementing index j=j+1, and determining whether the next respective candidate cell region CCR_f of the initial candidate set of candidate cell regions ICCR_i satisfies a first criterion FC_j. When it is determined that all the respective candidate cell region CCR_f of the initial candidate set of candidate cell regions ICCR_i have been checked, the method 100 comprises determining S118 a second candidate set of candidate cell regions SCCR_i or determining S126 whether enough images I_i have been selected. When it is determined that enough images I_i have been selected, the method 100 comprises proceeding C to determining S140 a first blood parameter BP_1. When it is not determined that enough images I_i have been selected, the method 100 comprises reiterating B to selecting S104 a next image I_i.

In one or more example methods, characterizing S106 the image I_i comprises determining S118 a second candidate set of cell regions SCCR_i.

In one or more example methods, characterizing S106 the image I_i comprises determining S122 whether each of the respective candidate cell regions CCR_fi of the first candidate set of candidate cell regions FCCR_i satisfies a second criterion SC_n, n=1, 2, . . . N, where N is the number of the candidate cell regions CCR_fi in the first candidate set of candidate cell regions FCCR_i.

In one or more example methods, in accordance with the determination that a respective candidate cell region CCR_fi of the first candidate set of candidate cell regions FCCR_i respectively satisfies the second criterion SC_n, the method 100 comprises including S124 the respective candidate cell region in a second candidate set of cell regions SCCR_i, and wherein the set of cell regions SCR_i is based on the second candidate set of candidate cell regions SCCR_i.

In one or more example methods, when it is not determined that each of the respective candidate cell regions CCR_fi satisfies the second criterion SC_j, the method 100 comprises discarding the respective candidate cell region CCR_fi and incrementing index n=n+1, and determining whether the next respective candidate cell region CCR_fi of the first candidate set of candidate cell regions FCCR_i satisfies a second criterion SC_n.

In one or more example methods, determining S118 a second candidate set of cell regions SCCR_i comprises initialising S120 index n=1 for starting to determine S122 whether each of the respective candidate cell regions CCR_fi satisfies the second criterion SC_n.

In one or more example methods, the method 100 comprises determining whether all the respective candidate cell region CCR_fi of the first candidate set of candidate cell regions FCCR_i have been checked, "Done?". When it is not determined that all the respective candidate cell region CCR_fi of the first candidate set of candidate cell regions FCCR_i have been checked, the method 100 comprises incrementing index n=n+1, and determining whether the next respective candidate cell region CCR_fi of the first candidate set of candidate cell regions FCCR_i satisfies a second criterion SC_n. When it is determined that all the respective candidate cell region CCR_fi of the first candidate set of candidate cell regions FCCR_i have been checked, the method 100 comprises determining S126 whether enough images I_i have been selected. When it is determined that enough images I_i have been selected, the method 100 comprises proceeding C to selecting S140 a distal image DI_i and/or a proximal image PI_1. When it is not determined that enough images I_i have been selected, the method 100 comprises reiterating B to selecting S104 a next image I_i.

FIGS. 3-6 show example images of cell regions in different image planes where an example method and/or blood analyser according to the present disclosure are carried out or used. FIGS. 3-6 each shows series of twelve images, such as image tiles, comprising cell regions in a plurality of image planes.

Figures 3, 4, 5, 6:
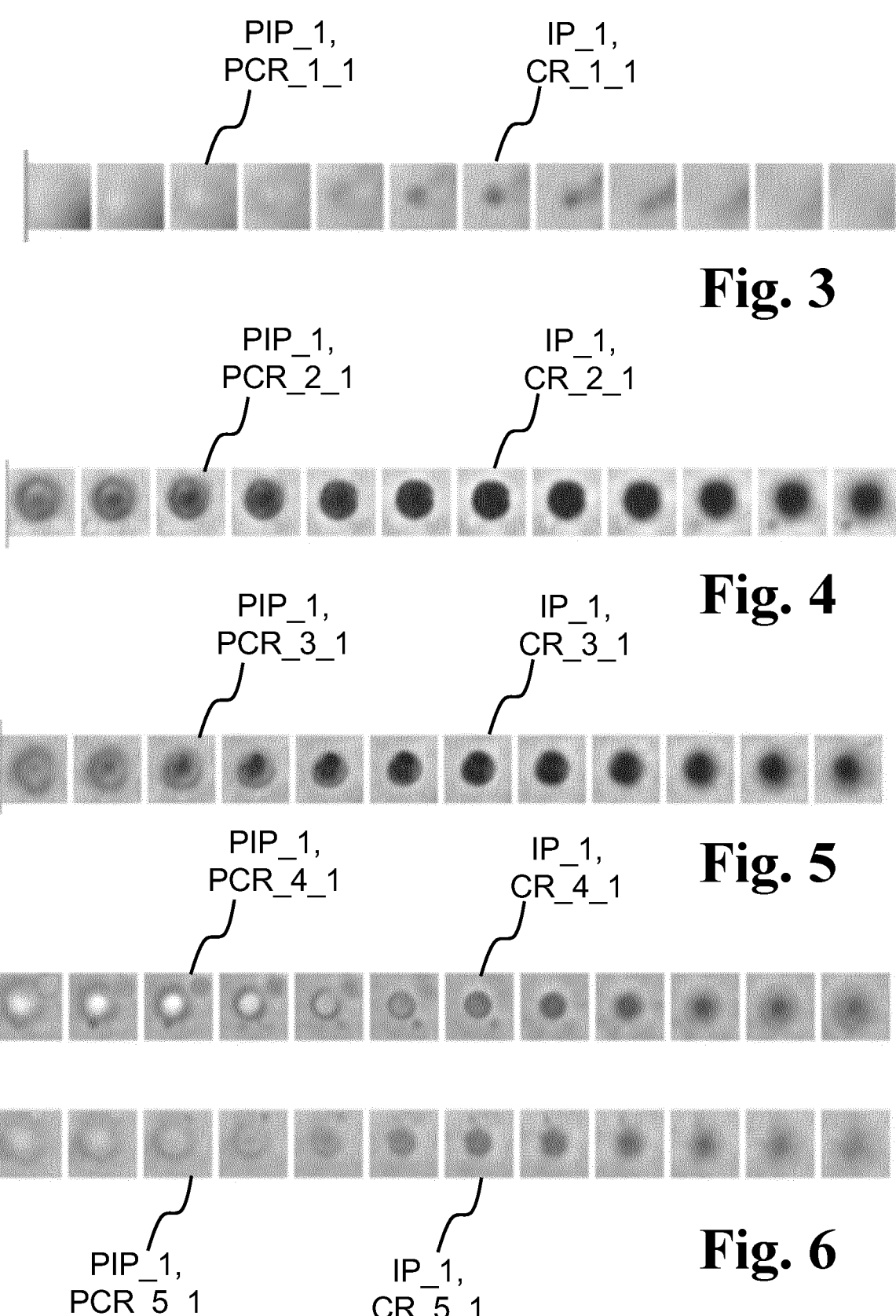
FIGS. 3-6 show example images of cell regions in different image planes where an example method and/or a blood analyser according to the present disclosure are carried out or used.

FIG. 3 shows a series of twelve images, such as image tiles, comprising a cell region in a plurality of image planes with an interplane distance of about 5 μm. A first cell region CR_1_1 may be seen in the seventh image starting from the left side being associated with a first image plane IP_1. In other words, the first cell region CR_1_1 belongs to the first image plane IP_1. In other words, the first cell region CR_1_1 represents a first cell CE_1 being in focus in the seventh image. A first proximal cell region PCR_1_1 may be seen in the third image starting from the left side being associated with a first proximal image plane PIP_1. In other words, the first proximal cell region PCR_1_1 do not belong to the first image plane IP_1. In other words, the first proximal cell region PCR_1_1 represents a first cell CE_1 being out of focus in the first proximal image of the proximal image plane at a distance of about 20 μm from the first image plane. As may be seen in the seventh image, the first cell region CR_1_1 comprises a dark spot. When looking at the third image for example, the first proximal cell region PCR_1_1 comprises a bright spot instead of the observed dark spot in the first cell region CR_1_1. The bright spot represents an optical phenomenon being a lens effect occurring in the first proximal image plane PIP_1. The fact that the dark spot in the first cell region CR_1_1 turns into a bright spot in the first proximal cell region PCR_1_1 may be indicative that the first cell is a platelet. It is therefore possible to determine a first cell parameter CP_1_1 for the first cell region CR_1_1, such as to classify the first cell CE_1, based on the first proximal cell region PCR_1_1. e.g. based on a first proximal cell parameter PCP_1_1.

FIG. 4 shows a series of twelve images, such as image tiles, comprising a cell region in a plurality of image planes with an interplane distance of about 5 μm. A second cell region CR_2_1 may be seen in the seventh image starting from the left side being associated with a first image plane IP_1. In other words, the second cell region CR_2_1 belongs to the first image plane IP_1. The second cell region CR_2_1 represents a second cell CE_2 being in focus in the seventh image. A second proximal cell region PCR_2_1 may be seen in the third image starting from the left side being associated with a first proximal image plane PIP_1. In other words, the second proximal cell region PCR_2_1 do not belong to the first image plane IP_1. In other words, the second proximal cell region PCR_2_1 represents the second cell CE_2 being out of focus in the first proximal image of the proximal image plane at a distance of about 20 μm from the first image plane. As may be seen in the seventh image, the second cell region CR_2_1 is mostly dark. On the other hand, when looking at the third image for example, the second proximal cell region PCR_2_1 comprises more contrast and a nucleus may be observed. The nucleus is revealed with an optical phenomenon occurring in the first proximal image plane PIP_1. The fact that the dark spot in the second cell region CR_2_1 changes to a second proximal cell region PCR_2_1 comprising more contrast and revealing a nucleus of the second cell CE_2 having a shape of a pair of glasses may be indicative that the second cell is a white blood cell and furthermore that it is an eosinophil that is very stained. It is therefore possible to determine a first cell parameter CP_2_1 for the second cell region CR_2_1, such as to classify the second cell CE_2, based on the second proximal cell region PCR_2_1, e.g. based on a first proximal cell parameter PCP_2_1.

FIG. 5 shows a series of twelve images, such as image tiles, comprising a cell region in a plurality of image planes with an interplane distance of about 5 μm. A third cell region CR_3_1 may be seen in the seventh image starting from the left side being associated with a first image plane IP_1. In other words, the third cell region CR_3_1 belongs to the first image plane IP_1. The third cell region CR_3_1 represents a third cell CE_3 being in focus in the seventh image. A third proximal cell region PCR_3_1 may be seen in the third image starting from the left side being associated with a first proximal image plane PIP_1. In other words, the third proximal cell region PCR_3_1 do not belong to the first image plane IP_1. In other words, the third proximal cell region PCR_3_1 represents the third cell CE_3 being out of focus in the first proximal image of the proximal image plane at a distance of about 20 μm from the first image plane. As may be seen in the seventh image, the third cell region CR_3_1 is mostly dark, and the cell type may be difficult to establish. On the other hand, when looking at the third image for example, the third proximal cell region PCR_3_1 comprises more contrast and a cytoplasm may be observed. The cytoplasm is revealed with an optical phenomenon occurring in the first proximal image plane PIP_1. The fact that the dark spot in the third cell region CR_3_1 changes to a third proximal cell region PCR_3_1 comprising more contrast and revealing a cytoplasm of the third cell CE_3 may be indicative that the third cell is a white blood cell and furthermore that it is a neutrophil that is very stained. It is therefore possible to determine a first cell parameter CP_3_1 for the third cell region CR_3_1, such as to classify the third cell CE_3, based on the third proximal cell region PCR_3_1, e.g. based on a first proximal cell parameter PCP_3_1.

FIG. 6 shows two series of twelve images, such as image tiles, comprising a cell region in a plurality of image planes with an interplane distance of about 5 μm. A fourth cell region CR_4_1 may be seen in the seventh image of the upper/first row of images in FIG. 6 when starting from the left side being associated with a first image plane IP_1. In other words, the fourth cell region CR_4_1 belongs to the first image plane IP_1. The fourth cell region CR_4_1 represents a fourth cell CE_4 being in focus in the seventh image. A fourth proximal cell region PCR_4_1 may be seen in the third image starting from the left side being associated with a first proximal image plane PIP_1. In other words, the fourth proximal cell region PCR_4_1 do not belong to the first image plane IP_1. In other words, the fourth proximal cell region PCR_4_1 represents the fourth cell CE_4 being out of focus in the first proximal image of the proximal image plane at a distance of about 20 μm from the first image plane. As may be seen in the seventh image, the fourth cell region CR_4_1 comprises a dark spot. When looking at the third image for example, the fourth proximal cell region PCR_4_1 comprises a bright spot instead of the observed dark spot in the fourth cell region CR_4_1. The bright spot represents an optical phenomenon being a lens effect occurring in the first proximal image plane PIP_1.

A fifth cell region CR_5_1 may be seen in the seventh image of the lower/second row of images in FIG. 6 when starting from the left side being associated with a first image plane IP_1. In other words, the fifth cell region CR_5_1 belongs to the first image plane IP_1. The fifth cell region CR_5_1 represents a fifth cell CE_5 being in focus in the seventh image. A fifth proximal cell region PCR_5_1 may be seen in the third image starting from the left side being associated with a first proximal image plane PIP_1. In other words, the fifth proximal cell region PCR_5_1 do not belong to the first image plane IP_1. In other words, the fifth proximal cell region PCR_5_1 represents the fifth cell CE_5 being out of focus in the first proximal image of the proximal image plane at a distance of about 20 μm from the first image plane. As may be seen in the seventh image, the fifth cell region CR_5_1 comprises a dark spot. When looking at the third image for example, the fifth proximal cell region PCR_5_1 also comprises a rather dark/grey spot.

The fact that the dark spot in the fourth cell region CR_4_1 turns into a bright spot in the fourth proximal cell region PCR_4_1 and that the dark spot in the fifth cell region CR_5_1 remains a dark spot in the fifth proximal cell region PCR_5_1 may be indicative that the fourth cell CE_4 is a red blood cell, RBC, such as an erythrocyte, compared to the fifth cell CE_5 being a weekly stained lymphocyte. It is therefore possible to determine a first cell parameter CP_4_1 for the fourth cell region CR_4_1, such as to classify the fourth cell CE_4, based on the fourth proximal cell region PCR_4_1, e.g. based on a fourth proximal cell parameter PCP_4_1. When just comparing the fourth cell region CR_4_1 and the fifth cell region CR_5_1 the cell regions may appear similar. However, when obtaining the additional information from the fourth proximal cell region PCR_4_1, the cell regions may be differentiated and thereby classified.

In a first aspect of the invention, the blood analyser disclosed in present disclosure is configured to analyze biological fluids, such as, e.g., human, animal, mammalian blood, and/or cell cultures. Moreover, in said further aspect the blood analyser is substituted by and/or comprises a biological fluid analyser, such as, e.g., a blood analyser and/or a cell culture analyser.

In the first aspect, any disclosed blood sample may be substituted by and/or comprise a biological fluid sample, such, e.g., as a human blood sample, an animal blood sample, a mammalian blood sample, and/or a cell culture sample.

In the first aspect, any disclosed prepared blood sample may be substituted by and/or comprise a prepared biological fluid sample, such, e.g., as a prepared human blood sample, a prepared animal blood sample, a prepared mammalian blood sample, and/or a prepared cell culture sample.

In the first aspect, any disclosed blood parameter may be substituted by and/or comprise a biological fluid parameter, such as human blood parameter, an animal blood parameter, a mammalian blood parameter, and/or a cell culture parameter.

In some embodiments of the first aspect, the cell culture comprises a culture of cells derived from multicellular eukaryotes, such as, e.g., mammalian cells, animal cells, and/or human cells. In some embodiments, the cell culture comprises a culture of cells grown from plant tissue culture, fungal culture, and/or microbiological culture (of microbes).

In the first aspect, a cell may therefore be a mammalian cell, an animal cell, a human cell, a plant tissue cultured cell, a fungal cultured cell, or a microbiologically cultured cell.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Memory may be one or more of a buffer, a flash memory, a hard drive, a removable media, a volatile memory, a non-volatile memory, a random access memory (RAM), or other suitable device. In a typical arrangement, memory may include a non-volatile memory for long term data storage and a volatile memory that functions as system memory for the processor. Memory may exchange data with processor over a data bus. Memory may be considered a non-transitory computer readable medium.

Memory may be configured to store information (such as information indicative of the one or more audio signals, the one or more sentiment metrics, the one or more appearance metrics, the speaker representations, the sentiment metric data, and/or the appearance metric data) in a part of the memory.

Furthermore, the labelling of a first element does not imply the presence of a second element and vice versa.

It may be appreciated that FIGS. 1-6 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented.

Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the example embodiments may be implemented at least in part by means of both hardware and software, and that several "means", "units" or "devices" may be represented by the same item of hardware.

The various example methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense.

The claimed invention is intended to cover all alternatives, modifications, and equivalents.

LIST OF REFERENCES

1 user
2 system
4 output
6 transmit/obtain
10 blood analyser
10A memory
10B interface
10C processor
20 microscope
22 container/cuvette
24 central portion
100 method of analysing a prepared blood sample
S102 obtaining image data
S104 selecting image
S104A selecting first image
S104B selecting second image
S104C selecting third image
S104D selecting fourth image
S104E selecting fifth image
S106 characterizing image
S106A determining set of cell regions
S106B determining initial candidate set of cell regions
S110 determining a first candidate set of cell regions
S112 determining a contrast parameter of the image, determining a distal contrast parameter of the distal image, determining a proximal contrast parameter of the proximal image
S114 determining whether each of the respective candidate cell regions satisfies a first criterion
S116 including the respective candidate cell region in a first candidate set of cell regions
S118 determining a second candidate set of candidate cell regions
S120 initialising index
S122 determining whether each of the respective candidate cell regions of the first candidate set of candidate cell regions satisfies a second criterion
S124 including the respective candidate cell region in a second candidate set of cell regions
S126 determining whether enough images have been selected
S130 determining background image
S132 determining contrast image
S134 determining binary image
S136 identify connected regions
S137 discarding the respective connected region
S138 determining whether each respective connected region of the connected regions satisfies an area criterion
S139 including the respective connected region satisfying the area criterion as a candidate cell region in the initial candidate set of candidate cell regions
S140 selecting distal image and/or proximal image
S140A selecting first distal image and/or first proximal image
S140B selecting second distal image and/or second proximal image
S140C selecting third distal image and/or third proximal image
S140D selecting fourth distal image and/or fourth proximal image S140E selecting fifth distal image and/or fifth proximal image
S142 determining distal set of cell regions and/or proximal set of cell regions
S144 determining first cell parameter
S144A determining first distal cell parameter
S144B determining first proximal cell parameter
S146 determining a first blood parameter
S148 outputting the first blood parameter
A proceed
B reiterate, restart
C proceed
PIP_i proximal image plane
PIP_1 first proximal image plane
IP_i image plane
IP_1 first image plane
DIP_i distal image plane
DIP_1 first distal image plane
IDIP_i intermediate distal image plane
IPIP_i intermediate proximal image plane
PH_i proximal height
PH_1 first proximal height
H_i height
H_1 first height
DH_i distal height
DH_1 first distal height
PD_i proximal distance
DD_i distal distance
PD_1 first proximal distance
DD_1 first distal distance
CE_1 first cell
$\Delta z$ stepping incrementation
z z-axis
ID image data
L_i image
PI_i proximal image
DI_i distal image
SCR_i set of cell regions
DSCR_i distal set of distal cell regions
PSCR_i proximal set of proximal cell regions
IDSCR_i intermediate distal set of distal cell regions
IPSCR_i intermediate proximal set of proximal cell regions
CR_k_i cell regions
DCR_k_i distal cell regions
PCR_k_i proximal cell regions
CP_k_i cell parameter(s)
DCP_p_i distal cell parameter(s)
PCP_p_i proximal cell parameter(s)
BP_1 first blood parameter
C_i number of cell regions
ICCR_i initial candidate set of candidate cell regions
CCR_f candidate cell regions of the initial set of candidate cell regions
CCR_fi candidate cell regions of the first set of candidate cell regions
BG_i background image
CI_i contrast image
BI binary image
COR_i connected regions
AC_m area criterion
FCCR_i first candidate set of candidate cell regions
SCCR_i second candidate set of candidate cell regions
FC_i first criterion
SC_i second criterion
PCP_i proximal contrast parameter
CP_i contrast parameter DCP_i distal contrast parameter
DCI_i distal contrast image
PCI_i proximal contrast image
TC third criterion

The invention claimed is:

1. A blood analyser, the blood analyser comprising a memory, an interface, and one or more processors, the blood analyser being configured to:
obtain image data of a prepared blood sample, the image data comprising data of a stack of images where each image of the stack of images is associated with an image plane, wherein each image plane is associated with a different height along a z-axis of the prepared blood sample;
select a first image associated with a first image plane of the prepared blood sample from the image data;
characterize the first image, wherein the characterization of the first image comprises determining a first set of cell regions belonging to the first image plane, wherein a cell region of the first set of cell regions is associated with a group of pixels in the first image representing one or more cells, a part of a cell, parts of cells, or an optical phenomena relating to one or more cells;
select a first distal image associated with a first distal image plane on a distal side of the first image plane, and determine a first distal set of distal cell regions associated with the first set of cell regions, wherein a cell region of the first distal set of cell regions is associated with a group of pixels in the first distal image representing one or more cells, a part of a cell, parts of cells, or an optical phenomena relating to one or more cells, wherein the determination of the first distal set of distal cell regions comprises determining that the first set of cell regions do not belong to the first distal image plane; and
determine a first cell parameter for each cell region of the first set of cell regions based on the first distal set of distal cell regions.

2. The blood analyser according to claim 1, wherein the blood analyser is configured to select a primary intermediate distal image associated with a primary intermediate distal image plane on a distal side of the first image plane, and to determine a primary intermediate distal set of distal cell regions associated with the first set of cell regions, and wherein the first cell parameter for each cell region of the first set of cell regions is based on the primary intermediate distal set of distal cell regions.

3. The blood analyser according to claim 2, wherein the selecting a first distal image is based on the primary intermediate distal set of distal cell regions.

4. The blood analyser according to claim 1, wherein the blood analyser is configured to select, from the image data, a first proximal image associated with a first proximal image plane on a proximal side of the first image plane; and to determine a first proximal set of proximal cell regions associated with the first set of cell regions; and wherein the determination of the first cell parameter is based on the first proximal set of proximal cell regions.

5. The blood analyser according to claim 4, wherein the determination of the first cell parameter comprises determining a first proximal cell parameter for each proximal cell region of the first proximal set of cell regions and wherein the first cell parameter is based on the first proximal cell parameter for the associated proximal cell regions of the first proximal image plane.

6. The blood analyser according to claim 5, wherein the first distal cell parameter and/or the first proximal cell parameter comprises one or more of a colour/contrast parameter, a geometry parameter, a morphology parameter, and a cell classification/type parameter.

7. The blood analyser according to claim 4, wherein a first distal distance between the first image plane and the first distal image plane, and a first proximal distance between the first image plane and the first proximal image plane are in the range from 2.5 μm to 75 μm.

8. The blood analyser according to claim 4, wherein the first proximal image plane is associated with a first proximal height in the prepared blood sample, the first proximal height being different from the first height.

9. The blood analyser according to claim 4, wherein the determination of the first proximal set of proximal cell regions comprises determining that the first set of cell regions do not belong to the first proximal image plane.

10. The blood analyser according to claim 1, wherein the blood analyser comprises a classification circuitry configured to operate according to a classification model, and wherein the determination of the first cell parameter comprises classifying each distal cell region of the first distal set of distal cell regions.

11. The blood analyser according to claim 1, wherein the determination of the first cell parameter comprises determining a first distal cell parameter for each distal cell region of the first distal set of distal cell regions and wherein the first cell parameter is based on the first distal cell parameter for the associated distal cell regions of the first distal image plane.

12. The blood analyser according to claim 1, wherein the blood analyser is further configured to determine a first blood parameter of the prepared blood sample based on the first cell parameters.

13. The blood analyser according to claim 1, wherein the first image plane is associated with a first height in the prepared blood sample.

14. The blood analyser according to claim 1, wherein the first distal image plane is associated with a first distal height in the prepared blood sample, the first distal height being different from the first height.

15. A computer program product comprising a non-transitory computer readable medium, having thereon a computer program comprising program instructions, the computer program being loadable into a data processing unit and configured to cause execution of the operations according to claim 1 when the computer program is run by the data processing unit.

16. A method of analysing a prepared blood sample, the method comprising:

obtaining image data of the prepared blood sample, the image data comprising data of a stack of images where each image of the stack of images is associated with an image plane, wherein each image plane is associated with a different height along a z-axis of the prepared blood sample;

selecting a first image associated with a first image plane of the prepared blood sample from the image data;

characterizing the first image, wherein the chacterizing the first image comprises determining a first set of cell regions belonging to the first image plane, wherein a cell region of the first set of cell regions comprises a group of pixels in the first image representing one or more cells, a part of a cell, parts of cells, or an optical phenomena relating to one or more cells;

selecting a first distal image associated with a first distal image plane on a distal side of the first image plane, and determining a first distal set of distal cell regions associated with the first set of cell regions, wherein a cell region of the first distal set of cell regions comprises a group of pixels in the first distal image representing one or more cells, a part of a cell, parts of cells, or an optical phenomena relating to one or more cells, wherein the determination of the first distal set of distal cell regions comprises determining that the first set of cell regions do not belong to the first distal image plane; and determining a first cell parameter for each cell region of the first set of cell regions based on the first distal set of distal cell regions.

* * * * *